United States Patent
Niimi et al.

(10) Patent No.: US 12,166,850 B2
(45) Date of Patent: Dec. 10, 2024

(54) CONTROL SYSTEM, INFORMATION PROCESSING DEVICE, AND NON-TRANSITORY COMPUTER READABLE MEDIUM

(71) Applicant: OMRON Corporation, Kyoto (JP)

(72) Inventors: Taiga Niimi, Kyoto (JP); Mitsuhiro Yoneda, Kyoto (JP); Ryota Akai, Kyoto (JP); Nobuyuki Sakatani, Kyoto (JP); Shigenori Sawada, Kyoto (JP)

(73) Assignee: OMRON Corporation, Kyoto (JP)

( * ) Notice: Subject to any disclaimer, the term of this patent is extended or adjusted under 35 U.S.C. 154(b) by 466 days.

(21) Appl. No.: 17/636,359

(22) PCT Filed: Mar. 10, 2020

(86) PCT No.: PCT/JP2020/010381
§ 371 (c)(1),
(2) Date: Feb. 18, 2022

(87) PCT Pub. No.: WO2021/059561
PCT Pub. Date: Apr. 1, 2021

(65) Prior Publication Data
US 2022/0286267 A1    Sep. 8, 2022

(30) Foreign Application Priority Data
Sep. 26, 2019    (JP) ................................ 2019-175283

(51) Int. Cl.
*H04L 7/00*    (2006.01)
*H04L 67/12*    (2022.01)

(52) U.S. Cl.
CPC ............ *H04L 7/0008* (2013.01); *H04L 67/12* (2013.01)

(58) Field of Classification Search
CPC ....... H04L 7/0008; H04L 67/12; H04L 41/12; H04L 41/0213; H04J 3/0641; H04J 3/12; H04J 3/0638; G05B 19/05
(Continued)

(56) References Cited

U.S. PATENT DOCUMENTS

| | | |
|---|---|---|
| 6,456,743 B1 | 9/2002 | Charrier et al. |
| 2004/0165606 A1 | 8/2004 | Okamura |

(Continued)

FOREIGN PATENT DOCUMENTS

| | | |
|---|---|---|
| CN | 101405956 | 4/2009 |
| CN | 104115450 | 10/2014 |
| CN | 104584468 | 4/2015 |
| CN | 105721190 | 6/2016 |

(Continued)

OTHER PUBLICATIONS

Office Action of China Counterpart Application, with English translation thereof, issued on Feb. 7, 2024, pp. 1-17.
(Continued)

*Primary Examiner* — Obaidul Huq
(74) *Attorney, Agent, or Firm* — JCIPRNET

(57) ABSTRACT

The present invention decides a reference timer for synchronizing time in consideration of an indicator which indicates a length of a transmission path. A timer decision means for deciding a reference timer out of timers having a plurality of transfer apparatuses acquires, for each of the plurality of transfer apparatuses, a path indicator which indicates a length of a path on a network through which data passes from the transfer apparatus to an end apparatus, and decides a reference timer out of timers of one or more transfer apparatuses having the path indicator which indicates that a path to the end apparatus has a predetermined length out of the plurality of transfer apparatuses.

10 Claims, 32 Drawing Sheets

(58) Field of Classification Search
USPC .................................................. 370/464, 498
See application file for complete search history.

(56) References Cited

U.S. PATENT DOCUMENTS

| | | | | |
|---|---|---|---|---|
| 2018/0270140 A1* | 9/2018 | Taniguchi | ............... | H04L 43/12 |
| 2019/0140815 A1 | 5/2019 | Faist et al. | | |
| 2019/0320437 A1* | 10/2019 | Gupta | ................... | H04W 72/20 |

FOREIGN PATENT DOCUMENTS

| | | | | |
|---|---|---|---|---|
| CN | 111034128 | | 4/2020 | |
| JP | H08123513 | | 5/1996 | |
| JP | H1011285 | | 1/1998 | |
| JP | 5937243 | | 6/2016 | |
| JP | 2016152489 | | 8/2016 | |
| JP | 2018112881 | | 7/2018 | |
| JP | 2019071692 | | 5/2019 | |
| WO | WO-2005096794 A2 * | 10/2005 | ......... | H04L 43/0852 |

OTHER PUBLICATIONS

"Search Report of Europe Counterpart Application", issued on Sep. 1, 2023, p. 1-p. 8.

Maryam Pahlevan et al., "Simulation Framework for Clock Synchronization in Time Sensitive Networking," 2019 IEEE 22nd International Symposium on Real-Time Distributed Computing (ISORC), May 2019, pp. 213-220.

Unknown, "802.1AS-2011—IEEE Standard for Local and Metropolitan Area Networks—Timing and Synchronization for Time-Sensitive Applications in Bridged Local Area Networks," IEEE, Mar. 2011, pp. 1-292.

"International Search Report (Form PCT/ISA/210) of PCT/JP2020/010381," mailed on Jun. 9, 2020, with English translation thereof, pp. 1-4.

"Written Opinion of the International Searching Authority (Form PCT/ISA/237) of PCT/JP2020/010381," mailed on Jun. 9, 2020, with English translation thereof, pp. 1-6.

* cited by examiner

| APPARATUS DATA | APPARATUS NAME | PORT ID | APPARATUS DATA | APPARATUS NAME | PORT ID | |
|---|---|---|---|---|---|---|
| A | PRODUCT NAME A | 1 | B | PRODUCT NAME B | 1 | } 20A |
| A | PRODUCT NAME A | 2 | C | PRODUCT NAME C | 1 | |
| APPARATUS | APPARATUS NAME | PORT | APPARATUS | APPARATUS NAME | PORT | |
| B | PRODUCT NAME B | 1 | A | PRODUCT NAME A | 1 | } 20B |
| B | PRODUCT NAME B | 2 | E | PRODUCT NAME E | 1 | |
| APPARATUS | APPARATUS NAME | PORT | APPARATUS | APPARATUS NAME | PORT | |
| C | PRODUCT NAME C | 1 | A | PRODUCT NAME A | 2 | } 20C |
| C | PRODUCT NAME C | 2 | D | PRODUCT NAME D | 1 | |
| APPARATUS | APPARATUS NAME | PORT | APPARATUS | APPARATUS NAME | PORT | |
| D | PRODUCT NAME D | 1 | C | PRODUCT NAME C | 2 | |
| D | PRODUCT NAME D | 2 | F | PRODUCT NAME F | 1 | } 20D |
| D | PRODUCT NAME D | 3 | G | PRODUCT NAME G | 1 | |

30A
| NUMBER OF HOPS | MOTION CONTROL TARGET |
| --- | --- |
| 1 | — |
| 2 | E |
| 3 | F, G |

30B
| NUMBER OF HOPS | MOTION CONTROL TARGET |
| --- | --- |
| 1 | E |
| 2 | — |
| 3 | — |
| 4 | F, G |

30C
| NUMBER OF HOPS | MOTION CONTROL TARGET |
| --- | --- |
| 1 | — |
| 2 | F, G |
| 3 | E |

30D
| NUMBER OF HOPS | MOTION CONTROL TARGET |
| --- | --- |
| 1 | F, G |
| 2 | — |
| 3 | — |
| 4 | E |

FIG. 9

| | | | | | | |
|---|---|---|---|---|---|---|
| APPARATUS DATA (21) | APPARATUS NAME (22) | PORT ID (23) | APPARATUS DATA (24) | APPARATUS NAME (25) | PORT ID (26) | |
| A | PRODUCT NAME A | 1 | B | PRODUCT NAME B | 1 | 20A |
| A | PRODUCT NAME A | 2 | C | PRODUCT NAME C | 1 | |
| APPARATUS | APPARATUS NAME | PORT | APPARATUS | APPARATUS NAME | PORT | |
| B | PRODUCT NAME B | 1 | A | PRODUCT NAME A | 1 | 20B |
| B | PRODUCT NAME B | 2 | E | PRODUCT NAME E | 1 | |
| APPARATUS | APPARATUS NAME | PORT | APPARATUS | APPARATUS NAME | PORT | |
| C | PRODUCT NAME C | 1 | A | PRODUCT NAME A | 2 | 20C |
| C | PRODUCT NAME C | 2 | D | PRODUCT NAME D | 1 | |
| APPARATUS | APPARATUS NAME | PORT | APPARATUS | APPARATUS NAME | PORT | |
| D | PRODUCT NAME D | 1 | C | PRODUCT NAME C | 2 | 20D |
| D | PRODUCT NAME D | 2 | F | PRODUCT NAME F | 1 | |

FIG. 22 (RING TOPOLOGY)

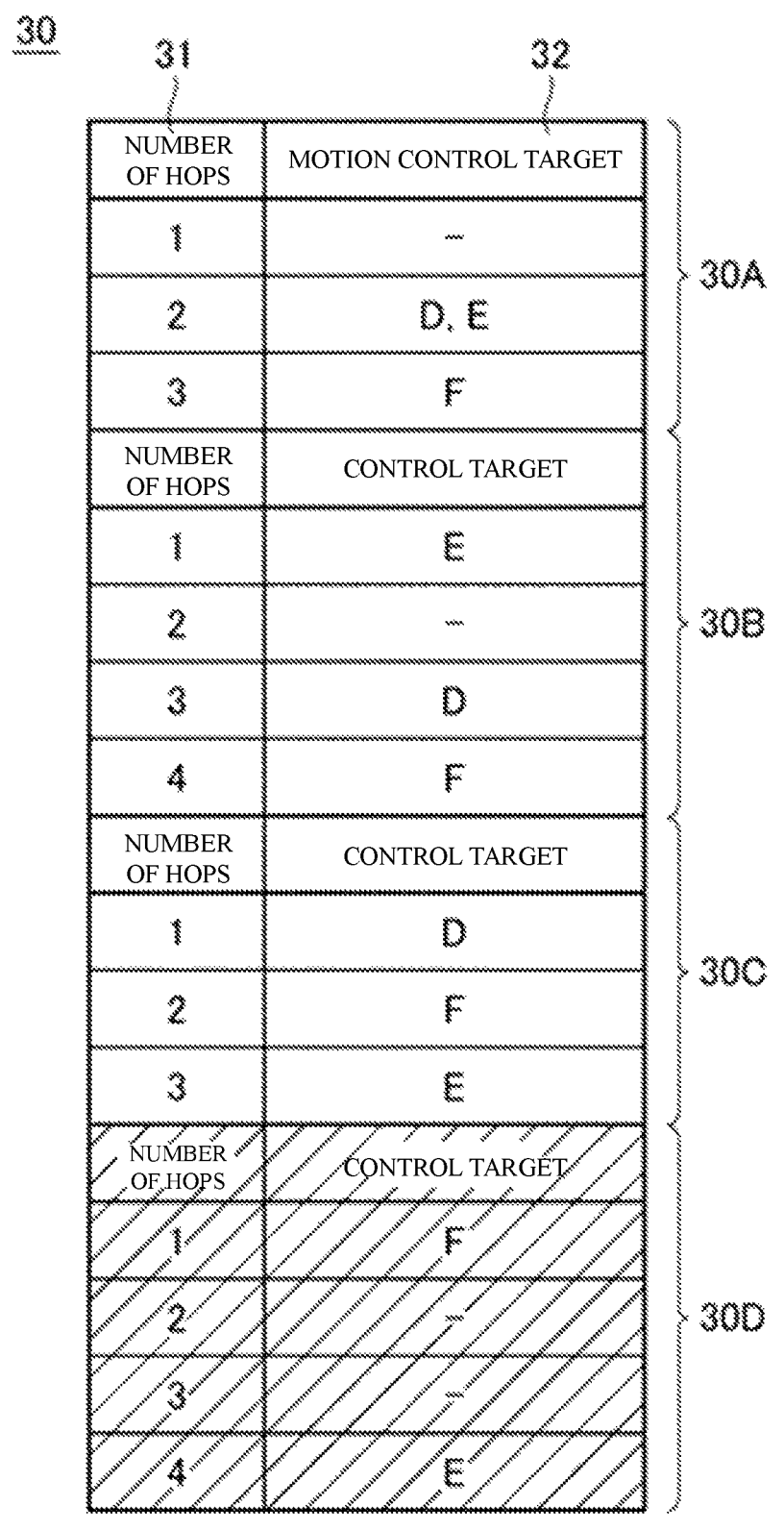

| NUMBER OF HOPS | MOTION CONTROL TARGET |
|---|---|
| 1 | — |
| 2 | D, E |
| 3 | F |
| NUMBER OF HOPS | CONTROL TARGET |
| 1 | E |
| 2 | — |
| 3 | D |
| 4 | F |
| NUMBER OF HOPS | CONTROL TARGET |
| 1 | D |
| 2 | F |
| 3 | E |
| NUMBER OF HOPS | CONTROL TARGET |
| 1 | F |
| 2 | — |
| 3 | — |
| 4 | E |

FIG. 33

FIG. 34 (RING TOPOLOGY)

CONTROL SYSTEM, INFORMATION PROCESSING DEVICE, AND NON-TRANSITORY COMPUTER READABLE MEDIUM

CROSS-REFERENCE TO RELATED APPLICATION

This application is a 371 application of the International PCT application serial no. PCT/JP2020/010381, filed on Mar. 10, 2020, which claims the priority benefits of Japan Patent Application No. 2019-175283, filed on Sep. 26, 2019. The entirety of each of the above-mentioned patent applications is hereby incorporated by reference herein and made a part of this specification.

TECHNICAL FIELD

The present invention relates to a control system in which apparatuses perform clock time synchronization with each other, an information processing device, and a program.

BACKGROUND ART

In various production sites, factory automation (FA) techniques using control apparatuses such as programmable logic controllers (PLC) have become widely distributed. Such control apparatuses control a plurality of apparatuses in a collaborative manner by transmitting and receiving data among the plurality of apparatuses that have performed clock time synchronization with each other via networks and controlling the plurality of apparatuses on the basis of the data.

In regard to clock time synchronization among apparatuses, Patent Literature 1 (Japanese Patent Laid-Open No. 2016-152489), for example, discloses a clock time synchronization method of causing clock times of a plurality of master apparatuses having a reference clock time an slave apparatuses to be synchronized through transmission and reception of clock time synchronization packets including clock time information. Specifically, the slave apparatuses accumulate offsets calculated for each of the plurality of master apparatuses on the basis of the clock time information of the clock time synchronization packets, measure evaluation values indicating states of clock time quality for each of the plurality of master apparatuses from the accumulated offsets, compare the evaluation values for each of the master apparatuses, and perform switching to the clock time information of a master apparatus in a state in which the clock time quality indicated by the evaluation value is higher.

CITATION LIST

Patent Literature

Patent Literature 1

Japanese Patent Laid-Open No. 2016-152489

SUMMARY OF INVENTION

Technical Problem

In an FA system, a plurality of control targets operate in accordance with control data transferred by following a control cycle based on clock time synchronization, and high clock time synchronization accuracy is required among the control targets. On the other hand, there has been a trend that the lengths of data transmission paths via networks increase with an increase in scales of FA systems. Thus, there is a probability that clock time synchronization accuracy will vary among the control targets due to communication delays including clock time information holding times and the like in other apparatuses disposed at midpoints of paths to master apparatuses depending on the control targets. Therefore, it is desired to decide a reference timer for clock time synchronization considering a transmission path length (communication delay) of a transmission path to each control target in an FA system in order to meet the aforementioned requirement.

However, Patent Literature 1 does not propose clock time synchronization in the FA system. According to Patent Literature 1, a state of clock time quality in a transmission path is taken into consideration while a master is selected by placing priority on accuracy of the reference clock time of the master apparatus, and it is thus not possible to respond to the aforementioned demand regarding the FA system.

The present disclosure provides a control system, an information processing device, and a program for deciding a reference timer for clock time synchronization considering an indicator indicating a length of a transmission path in an FA system.

Solution to Problem

A control system according to the present disclosure is a control system including a plurality of apparatuses connected to an FA network, in which each of the plurality of apparatuses includes a timer that manages a time, the timers of the plurality of apparatuses performs clock time synchronization with a reference timer that manages a reference time, the plurality of apparatuses include one or more end apparatuses connected to ends of the network, and a plurality of transfer apparatuses transferring data related to control to the one or more end apparatuses, the control system including: a timer decision means for deciding the reference timer out of timers that the plurality of transfer apparatuses have, in which the timer decision means includes a path indicator acquisition means for acquiring, for each of the plurality of transfer apparatuses, a path indicator which indicates a length of a path on a network through which the data passes from the transfer apparatus until arrival at the one or more end apparatuses, and decides the reference timer out of the timers of the one or more transfer apparatuses having the path indicator which indicates that a path until the arrival at the one or more end apparatuses has a predetermined length.

According to the present disclosure, it is possible to decide the reference timer for clock time synchronization considering the indicator indicating the length of the path through which data is transferred to each end apparatus in the FA system.

In the aforementioned disclosure, time information of the reference timer is transferred to a target apparatus in the clock time synchronization, and the predetermined length of the path includes a length that is able to secure a constant communication delay for transfer of the time information to the target apparatus.

According to the present disclosure, it is possible to set the predetermined length of the path referred to for selecting one or more candidates for deciding the reference timer to a length that can secure a constant communication delay required to transfer the time information to the target apparatus.

In the aforementioned disclosure, the plurality of transfer apparatuses include one or more controllers that execute control arithmetic operations at cycles based on the clock time synchronization and transfer data related to the control, which is a result of the arithmetic operations, to the network, and the one or more end apparatuses include an apparatus controlling a control target using the data related to the control transferred from a controller with a shortest cycle out of the one or more controllers.

According to the present disclosure, it is possible to regard the timers that the plurality of apparatuses including the controllers that calculate data to be used by the end apparatuses to control the control target at the shortest cycle have as candidates of the reference timer.

In the aforementioned disclosure, the control target includes a motion control target, a behavior of which is controlled in accordance with the data related to the control.

According to the present disclosure, it is possible to regard the timers that the plurality of transfer apparatuses including the controllers that calculate data to be used to control a motion control target of the end apparatuses at the shortest cycle have as candidates of the reference timer.

In the aforementioned disclosure, the timer decision means further includes an accuracy indicator calculation means for calculating an accuracy indicator indicating accuracy of the clock time synchronization from accuracy of the times of the timers and the path indicators of the transfer apparatuses that include the timers, and a candidate selection means for selecting one or more candidates for deciding the reference timer out of the timers of the one or more transfer apparatuses that have the path indicators indicating that the paths until the arrival at the one or more end apparatuses have the predetermined length, and the reference timer is decided on the basis of the accuracy indicator of each selected timer out of the one or more timers selected as the candidates.

According to the present disclosure, it is possible to calculate the indicator to be used to decide the candidates from accuracy of the time of each timer and the path indicator of the transfer apparatus having the timer in a case in which candidate timers as candidates of the reference timer are decided.

In the aforementioned disclosure, the candidate selection means further specifies a controller with a shortest cycle out of one or more controllers included in the one or more transfer apparatuses with the path indicators indicating the paths with the predetermined length, and selects, as the one or more candidates for deciding the reference timer, timers included by the specified controller and one or more transfer apparatuses through which the data from the controller passes until arrival at the one or more end apparatuses.

According to the present disclosure, it is possible to decide the reference timer out of the timers that the controller that calculates the data to be used by the end apparatuses to control the control target at the shortest cycle and the transfer apparatuses that transfer the data to the end apparatuses have.

In the aforementioned disclosure, the timer decision means further includes an accuracy indicator calculation means for calculating an indicator indicating accuracy of the clock time synchronization from accuracy of the times of the timers and the path indicators of the transfer apparatuses that have the timers, and decides the reference timer on the basis of the accuracy indicator of each timer out of the timers that the plurality of transfer apparatuses have.

According to the present disclosure, it is possible to use the indicator calculated from the accuracy of the time of each timer and the path indicator of the transfer apparatus that has the timer, as the indicator used to decide the reference timer.

In the aforementioned disclosure, the control system further includes: a means for selecting one transfer apparatus out of the plurality of transfer apparatuses on the basis of information indicating margins of resources of each transfer device relating to program execution, and the one selected transfer device includes the timer decision means.

According to the present disclosure, it is possible to cause the transfer apparatus that has a resource that can implement the timer decision means to implement the timer decision means from among the transfer apparatuses that the control system includes.

An information processing device according to the present disclosure is an information processing device that is able to be connected to a control system including a plurality of apparatuses connected to an FA network, in which each of the plurality of apparatuses includes a timer that manages a time, the timers of the plurality of apparatuses perform clock time synchronization with a reference timer that manages a reference time, the plurality of apparatuses includes one or more end apparatuses connected to ends of the network, and a plurality of transfer apparatuses that transfer data related to control to the one or more end apparatuses, the information processing device including: a timer decision means for deciding the reference timer out of the timers that the plurality of transfer apparatuses have, in which the timer decision means includes a path indicator acquisition means for acquiring, for each of the plurality of transfer apparatuses, a path indicator which indicates a length of a path on a network through which data passes from the transfer apparatus until arrival at the one or more end apparatuses, and a candidate selection means for selecting one or more candidates for deciding the reference timer out of the timers of the one or more transfer apparatuses having the path indicator which indicates that a path until the arrival at the one or more end apparatuses has a predetermined length.

According to the present disclosure, it is possible to decide the reference timer for clock time synchronization considering the indicator indicating the length of the path for transferring data to the end apparatuses in the FA system.

A program according to the present disclosure is a program that causes a computer to execute a setting method for a control system including a plurality of apparatuses connected to an FA network. Each of the plurality of apparatuses has a timer that manages a time, the timers of the plurality of apparatuses perform clock time synchronization with a reference timer that manages a reference time, the plurality of apparatuses include one or more end apparatuses connected to ends of the network, and a plurality of transfer apparatuses that transfer data related to control to the one or more end apparatuses, the setting method includes the step of deciding the reference timer out of the timers that the plurality of transfer apparatuses have, and the step of deciding the reference timer includes the steps of acquiring, for each of the plurality of transfer apparatuses, a path indicator which indicates a length of a path on a network through which the data passes from the transfer apparatus until arrival at the one or more end apparatuses, and deciding the reference timer out of the timers of the one or more transfer apparatuses having the path indicator which indicates that a path until the arrival at the one or more end apparatuses has a predetermined length.

According to the present disclosure, the computer can decide the reference timer for clock time synchronization considering the indicator indicating the length of the path for transferring data to the end apparatuses in the FA system, by the program being executed.

Advantageous Effects of Invention

According to the present disclosure, it is possible to decide a reference timer for clock time synchronization in consideration of an indicator indicating a length of a path to transfer data to an end apparatus in an FA system.

BRIEF DESCRIPTION OF DRAWINGS

FIG. 8 is a diagram schematically illustrating an example of SNMP information 603 according to the present embodiment.

FIG. 9 is a diagram schematically illustrating an example of topology information 30 according to the present embodiment.

FIG. 19 is a diagram schematically illustrating another example of the SNMP information 603 according to the present embodiment.

FIG. 33 is a diagram schematically illustrating another example of the topology information 30 according to the present embodiment.

DESCRIPTION OF EMBODIMENTS

Hereinafter, embodiments according to the present invention will be described with reference to the drawings. In the following description, the same reference signs will be applied to the same parts and components. These have the same names and functions. Thus, detailed description thereof will not be repeated.

A. Application Examples

First, an example of a situation to which the present invention is applied will be described with reference to FIG.

Figure 1:
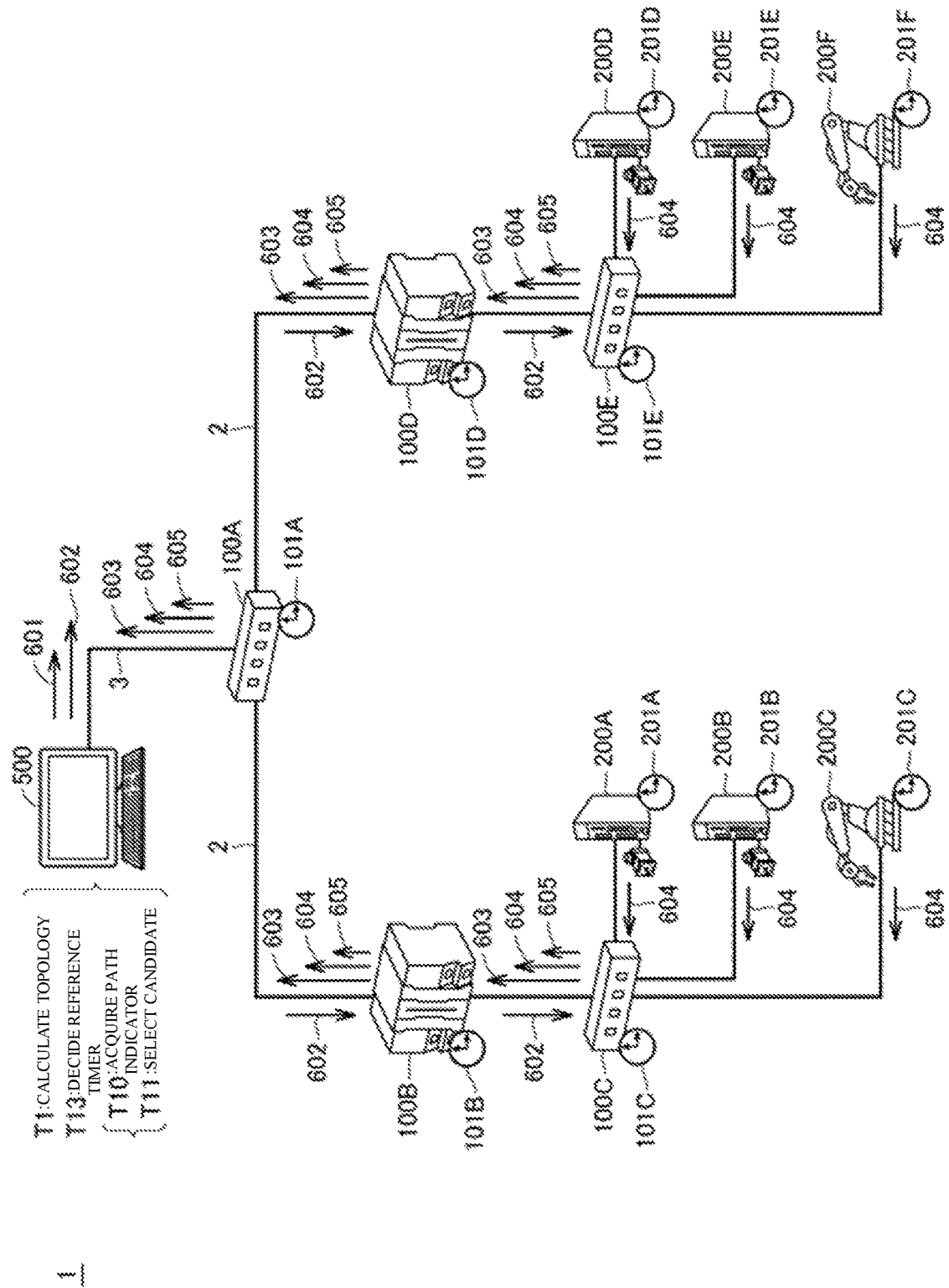
FIG. 1 is a diagram schematically illustrating a configuration of a control system 1 according to an embodiment.

1. FIG. 1 is a diagram schematically illustrating a configuration of a control system 1 according to an embodiment. Referring to FIG. 1, the control system 1 includes a plurality of apparatuses connected to an FA network 2 and performing clock time synchronization with each other. In the present embodiment, the clock time synchronization among the apparatuses is realized by employing a high-accuracy time synchronization protocol such as the Institute of Electrical and Electronics Engineers (IEEE) 1588, IEEE 802.1AS, or IEEE 802.1AS-Rev, for example.

The plurality of apparatuses connected to the network 2 includes switches 100A, 100B, 100C, 100D, and 100E as examples of "transfer apparatuses" and end points 200A, 200B, 200C, 200D, 200E, and 200F as examples of "end apparatuses". The switches 100A, 100B, 100C, 100D, and 100E include timers 101A, 101B, 101C, 101D, and 101E, respectively. The switches 100A, 100B, 100C, 100D, and 100E will be collectively referred to as switches 100 in a case in which common functions such as a switch function are described. Also, the timers 101A, 101B, 101C, 101D, and 101E will also be collectively referred to as timers 101 in a case in which common functions are described. The end points 200A, 200B, 200C, 200D, 200E, and 200F include timers 201A, 201B, 201C, 201D, 201E, and 201F, respectively. Since the end points 200A, 200B, 200C, 200D, 200E, and 200F have common functions, the end points will be collectively referred to as end points 200 in a case in which the common functions are described. The timers 201A, 201B, 201C, 201D, 201E, and 201F will also be collectively referred to as timers 201 in a case in which common functions are described.

In the present embodiment, the "transfer apparatuses" have a function of transferring data (typically, data related to control) to a network 2. The "transfer apparatuses" include a switch function of relaying the data. With the switch function, data that inputs to input ports of the transfer apparatuses connected to the network 2 is typically sent to the network 2 via output ports of the transfer apparatuses. Adjacent apparatuses connected to the input ports and the output ports can include other "transfer apparatuses" or "end apparatuses". In this manner, each transfer apparatus provides a so-called relay function of transferring data input from adjacent apparatuses to other adjacent apparatuses.

In the present embodiment, the "end apparatuses" are apparatuses that do not include the switch function and include apparatuses that drive a "control target" using control data received via the network 2. Specifically, the "control target" includes a machine or equipment, a sensor, or the like that is included in an FA production line and serves as a control target. The machine or the equipment includes a mechanical mechanism such as a robot, a table, or a conveyer. Control of behaviors of such a machine, equipment, or the like can include a control arithmetic operation such as motion control for controlling motions (a speed, a torque, and the like) of a servo motor related to the machine or the equipment. For such motion control, execution of a control program such as a motion program for positioning the mechanical mechanism such as a positioning table or a robot is also assumed.

Also, the "end apparatuses" correspond to apparatuses that receive control data of the control target via the network 2 and control operations of the control target on the basis of the received control data. Although the "end apparatuses" are not limited, examples thereof include an IO unit that controls inputs and outputs of the control target such as a sensor and a servo motor driver that drives the aforementioned servo motor in accordance with the control data, for example.

The "transfer apparatuses" connected to the network 2 include one or more "controllers" that execute the control program (control arithmetic operation) at cycles based on the aforementioned clock time synchronization and transmit control data that is a result of the arithmetic operation to the network 2 via the output ports. The controllers can include programmable logic controllers (PLCs). In FIG. 1, the switches 100B and 100D correspond to the controllers, for example.

As the network 2, it is preferable to employ a bus or a network that performs constant cycle communication that secures a data arrival time in accordance with the TSN standard, for example. For example, a network based on a known protocol such as EtherNet/IP (registered trademark) as a higher-order protocol of the TSN may be employed for the network 2, for example. EtherNet/IP is an industrial open network in which a control protocol is mounted on the general-purpose Ethernet (registered trademark). In the network 2, data is transferred in units of frames, for example.

The "timers" (timers 101 and 201) manage time with certain accuracy. Specifically, the timers 101 generate pulses as references of timings at which data is transmitted and received from the network 2 or an instruction for a control target control cycle or the like is provided. Although the timers 101 and 201 are not limited, it is possible to use real-time clocks or free run counters that count up (increment or decrement) at predetermined cycles. It is possible to calculate a current clock time by handling count values output from the free run counter as an elapse time from a certain time point, and this enables the timers 101 and 102 to operate as the timers.

The "reference timer" means a timer that is selectively decided among timers (timers 101) that the plurality of transfer apparatuses (switches 100) connected to the network 2 have and manages reference time for clock time synchronization. Hereinafter, the reference timer will also be referred to as a grand master.

In the present embodiment, accuracy of the time (clock accuracy) that the "timers" have is mainly accuracy of time managed (measured) by the timers (such as milliseconds or microseconds, for example). The accuracy of the time is, for example, less than milliseconds or microseconds. Also, the accuracy of the time may include a degree of stability indicating that the timer can stably measure the time.

In the present embodiment, a field value detected by the control target is transferred via the network 2. The concept of the "field value" can include a series of values obtained by successively (or non-successively with specific intervals) detecting a temporal change in data (value) for an arbitrary control target.

A control arithmetic operation based on the field value is performed by the controller executing the control program, and the value calculated in the control arithmetic operation corresponds to control data including a command value, a control amount, and the like for controlling the "control target". The controller sends (transfers) the control data to the network 2 at a predefined cycle based on clock time synchronization. The end points 200 receive the control data at the cycle based on the clock time synchronization and control the control target in accordance with the received control data. Specifically, in a case of motion control for controlling a robot arm position, the plurality of servo motors corresponding to a plurality of shafts of the arm are controlled in synchronization with a control cycle by the plurality of corresponding end points 200. Therefore, high accuracy is required in regard to clock time synchronization of the timers 201 of the plurality of end points 200 for controlling the plurality of control targets in a mutually synchronized manner.

Moreover, the control system 1 includes a support apparatus 500 that can be connected to the network 2. The support apparatus 500 is an example of the "information processing device" that assists preparation needed to cause the plurality of apparatuses in the control system 1 to be clock time-synchronized. Specifically, the support apparatus 500 provides an assist environment by executing an application program of a support tool. The support apparatus 500 can provide an environment for supporting users to operate the support tool, for example, a user interface (UI) that receives operations of the support tool. The support apparatus 500 may be a general-purpose computer and may be of a stationary type as illustrated or may be of a user portable type.

Although the support apparatus 500 is connected to the network 2 through communication with a switch 100A via a cable 3 in accordance with a universal serial bus (USB), for example, the connection form of the support apparatus 500 is not limited thereto and may be connected to the network 2 in a wireless manner, for example.

If a support tool 770 (FIG. 5) is activated, then the support apparatus 500 decides a grand master for clock time synchronization considering an indicator indicating the lengths of transmission paths to the end points 200 of the network 2. Note that in a case in which the support tool 770 is activated, the apparatuses connected to the network 2 are in a state in which the powers are turned on while operations related to control are stopped, that is, data related to control (such as a field value and control data) is not transferred in the network 2.

The support tool 770 transmits an information request 602 for requesting transmission of information defined in advance to the support apparatuses 500 to the plurality of apparatuses connected to the network 2.

A switch 100 transmits, to the support apparatus 500 simple network management protocol (SNMP) information 603 and clock information 605 as the information defined in advance in response to the information request 602. Also, the switch 100 receives apparatus information 604 as the information defined in advance from the end points 200 in response to the information request 602 and transmits the received apparatus information 604 to adjacent switches 100. In this manner, the apparatus information 604 of each end point 200 is transferred to the support apparatus 500 via the one or more switches 100 in the network 2.

The SNMP information 603 from the switch 100 is information that the switch 100 has and includes information regarding the switch 100 itself (an identifier (for example, a media access control (MAC) address, a product name), information regarding adjacent apparatuses connected to the switch 100 (identifiers (for example, MAC addresses, product names)), information regarding ports to which the adjacent apparatuses are connected, and the like. The apparatus information 604 is information regarding the identifiers, the apparatus types, and the ports of the end points 200 and includes information regarding the ports of the switches to which the end points 200 are connected.

The clock information 605 is information that the timers 101 (or timers 201) have and includes accuracy of time that the timers manage (clock accuracy).

The support tool 770 analyzes the SNMP information 603 received from each switch 100 and the apparatus information 604 received from each end point 200 and calculates topology information 30 indicating a mutual connection form among the plurality of apparatuses in the network 2 on the basis of the analysis result (Step T1). The support tool 770 decides a grand master among the timers 101 that the plurality of switches 100 have on the basis of the topology information 30 and the clock information 605 (Step T13). When the grand master is decided, the support tool 770 acquires, for each switch 100, a path indicator indicating the path length in the network 2 until arrival at the end point 200 from the switch 100 (Step T10). Then, the support tool 770 selects, as candidates of the aforementioned grand master, the timers 101 that one or more switches 100 with the aforementioned path indicators indicating the path with a predetermined length have from among the plurality of switches 100 (Step T11). If the grand master is decided from among the one or more selected candidates, then the support tool 770 transmits priority setting information 601 to the switch 100 of the grand master (timer 101).

The switch 100 that has received the priority setting information 601 sets, in the apparatus itself, priority of a value indicating the grand master on the basis of the priority setting information 601. The priority set in the switch 100 in this manner corresponds to a value to be referred to for selecting (deciding) the timer 101 of the switch 100 as the grand master with higher priority than the other timers as will be described later.

Therefore, the support tool 770 can select the candidate timers in consideration of the path indicators indicating the lengths of the paths for transmitting data such as control data to the end points 200 controlling the control targets and decide the grand master from the selected candidate timers in the FA system.

Hereinafter, more specific application examples of the present embodiment will be described.

B. Hardware Configuration Example

Figure 2:
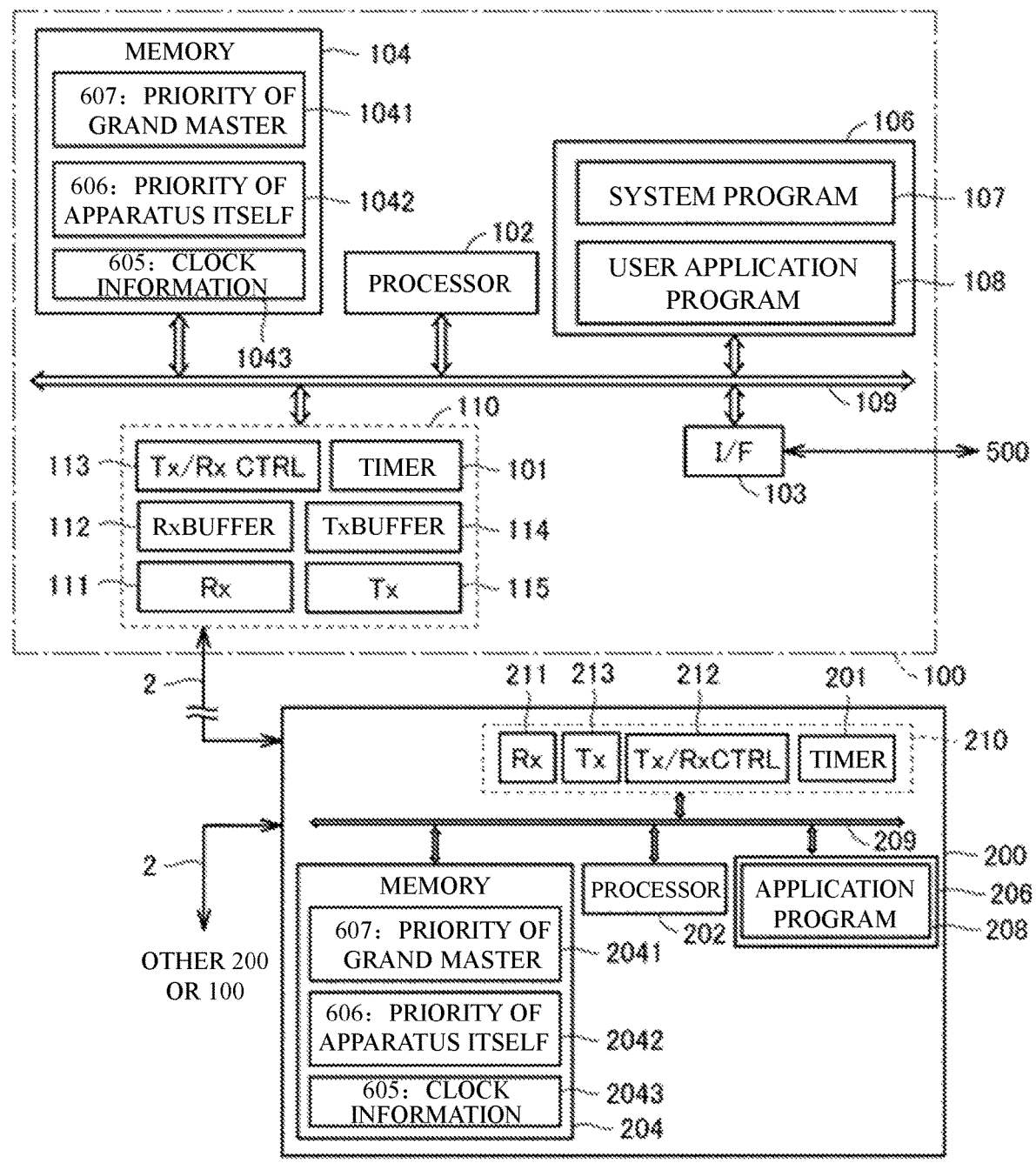
FIG. 2 is a schematic view illustrating an example of a hardware configuration of the control system 1 according to the present embodiment.

FIG. 2 is a schematic view illustrating an example of a hardware configuration of the control system 1 according to the present embodiment. In FIG. 2, an end point 200 is illustrated with the end point 200 associated with a switch 100. Although the switch 100 in FIG. 2 is typically configured using a PLC as a base, the switch 100 is not limited to the configuration as long as the configuration includes the switch function as described above.

Referring to FIG. 2, the switch 100 includes, as main components, a processor 102 such as a central processing unit (CPU), a memory 104, a storage 106, and a network controller 110. Also, the switch 100 includes an interface (I/F) 103 that communicates with the support apparatus 500. These communicate with each other via an internal bus 109.

A user application program 108 designed in accordance with control targets and the like is stored in the storage 106 in addition to a system program 107 including an operating system (OS) for controlling each component of the switch 100. The user application program 108 includes various control programs such as a motion control program designed in accordance with the control targets.

The processor 102 realizes various kinds of processing including processing described later by reading and executing. in the memory 104, the system program 107 and the user application program 108 stored in the storage 106. The memory 104 is a volatile storage device such as a dynamic random access memory (DRAM) or a static random access memory (SRAM).

The memory 104 includes a region 1041 for storing grand master priority 607, a region 1042 for storing priority 606 of the timer 101 of the apparatus itself, and a region 1043 for storing the clock information 605 indicating accuracy of the timer 101 of the apparatus itself (clock accuracy). The priority 606 and 607 is used in best master clock algorithm (BMCA) processing (FIG. 16) for selecting the grand master.

The network controller 110 provides an interface for the switch 100 to exchange data with the end points 200 or other switches 100 via the network 2. The network controller 110 includes, as main components, a reception circuit (Rx) 111, a reception (Rx) buffer 112, a transmission/reception controller (Tx/Rx CTRL) 113, a transmission (Tx) buffer 114, a transmission circuit (Tx) 115, and a timer 101.

The reception circuit 111 receives a frame transferred through the network 2 at a cycle based on clock time synchronization via an input port (not illustrated) and writes, in the reception buffer 112, data stored in the received frame. The transmission/reception controller 113 successively reads the reception frame written in the reception buffer 112. The transmission/reception controller 113 extracts only data required for the processing of the switch 100 and outputs the data to the processor 102. The transmission/reception controller 113 successively write, in the transmission buffer 114, the data or the frame to be transmitted to the end points 200 in accordance with a command from the processor 102. The transmission circuit 115 successively sends data stored in the transmission buffer 114 to the network 2 via an output port (not illustrated) at a cycle at which the frame is transferred through the network controller 110 and based on the clock time synchronization.

Referring to FIG. 2, the end points 200 realize various functions required to realize control of the control targets. Typically, each end point 200 is in charge of collection of field information from equipment, apparatuses, and the like as control targets or outputs of control commands to the equipment, the apparatuses, and the like as the control targets. Each end point 200 includes, as main components, a processor 202, a memory 204, a storage 206 that stores an application program 208, and a communication circuit 210. The communication circuit 210 processes the frame transferred through the network 2. In other words, the communication circuit 210 receives some frame from the input port (not illustrated) via the network 2, writes data in the received frame and/or reads data from the frame, and then sends the frame to the network 2 via the output port (not illustrated).

More specifically, the communication circuit 210 includes a reception circuit (Rx) 211, a transmission/reception controller (Tx/Rx CTRL) 212, a transmission circuit (Tx) 213, and a timer 201. The reception circuit 211 and the transmission circuit 213 are sites physically connected to the network 2, receive the frame transferred through the network 2, processes the received frame, and sends the processed frame to the network 2 in accordance with a command from the transmission/reception controller 212. The transmission/reception controller 212 writes data in the frame transferred through the network 2 and/or reads data from the frame.

The memory 204 includes a region 2041 for storing priority 607 of the grand master, a region 2042 for storing priority 606 of the timer 201 of the apparatus itself, and a region 2043 for storing clock information 605 indicating accuracy of the timer 201 of the apparatus itself (clock accuracy). The priority 607 and 606 is information used in BMCA processing for selecting the grand master, which will be described later. The components of the end point 200 communicate with each other via a bus 209.

The timer 101 of the switch 100 generates a clock as a reference of a timing of an input/output of the transmission/reception controller 113, a timing at which the switch 100 executes processing, and the like. Also, the timer 201 of the end point 200 generates a clock as a reference of a timing at which the transmission/reception controller 212 outputs a command, a timing at which the end point 200 executes processing, and the like. The timers 101 and the timers 201 are clock time-synchronized with the grand master as will be described later, and it is thus possible to cause the switches 100 and the end points 200 connected to the network 2 to operate in a mutually clock time-synchronized manner.

C. Exemplification of Apparatus Connection Form

Figure 3:
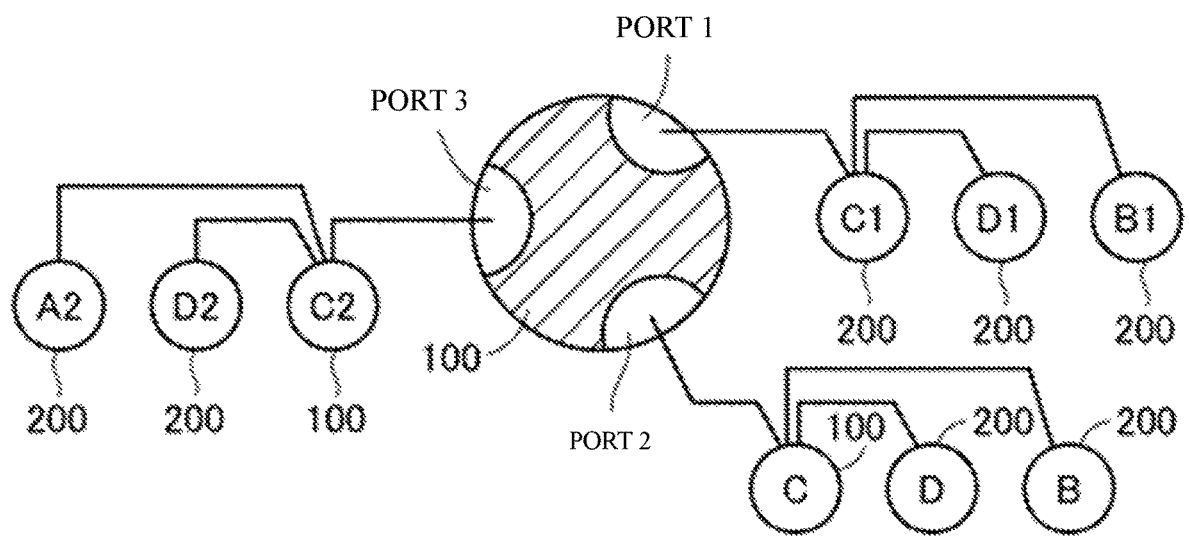
FIG. 3 is a diagram schematically illustrating an example of a connection form of apparatuses via a network according to the present embodiment.

FIG. 3 is a diagram schematically illustrating an example of a connection form of apparatuses via a network according to the present embodiment. In the network configuration in FIG. 3, a connection form of a plurality of apparatuses (the switches 100 or the end points 200) around the hatched switch 100 at the center is schematically illustrated. The switch 100 at the center includes, as ports for transmitting and receiving frames via the network, ports P1, P2, and P3, for example. Although apparatuses "C1", "C", and "C2" are connected to the ports P1, P2, and P3, a plurality of apparatuses may be connected to each ports (multi-connection). The apparatuses "C1", "C", and "C2" that are continuous with the ports of the switch 100 at the center also connected to other apparatuses via ports that the apparatuses have. The apparatus "C1" establishes multi-connection to apparatuses "D1" and "B1". The apparatus "C" establishes multi-connection to apparatuses "D" and "B". Also, the apparatus "C2" establishes multi-connection with apparatuses "D2" and "A2". In The present embodiment, such a connection form among the apparatuses (information regarding the apparatuses connected to the ports and information regarding the ports) is calculated as topology information 30, which will be described later.

D. Hardware Configuration of Support Apparatus 500

Figure 4:
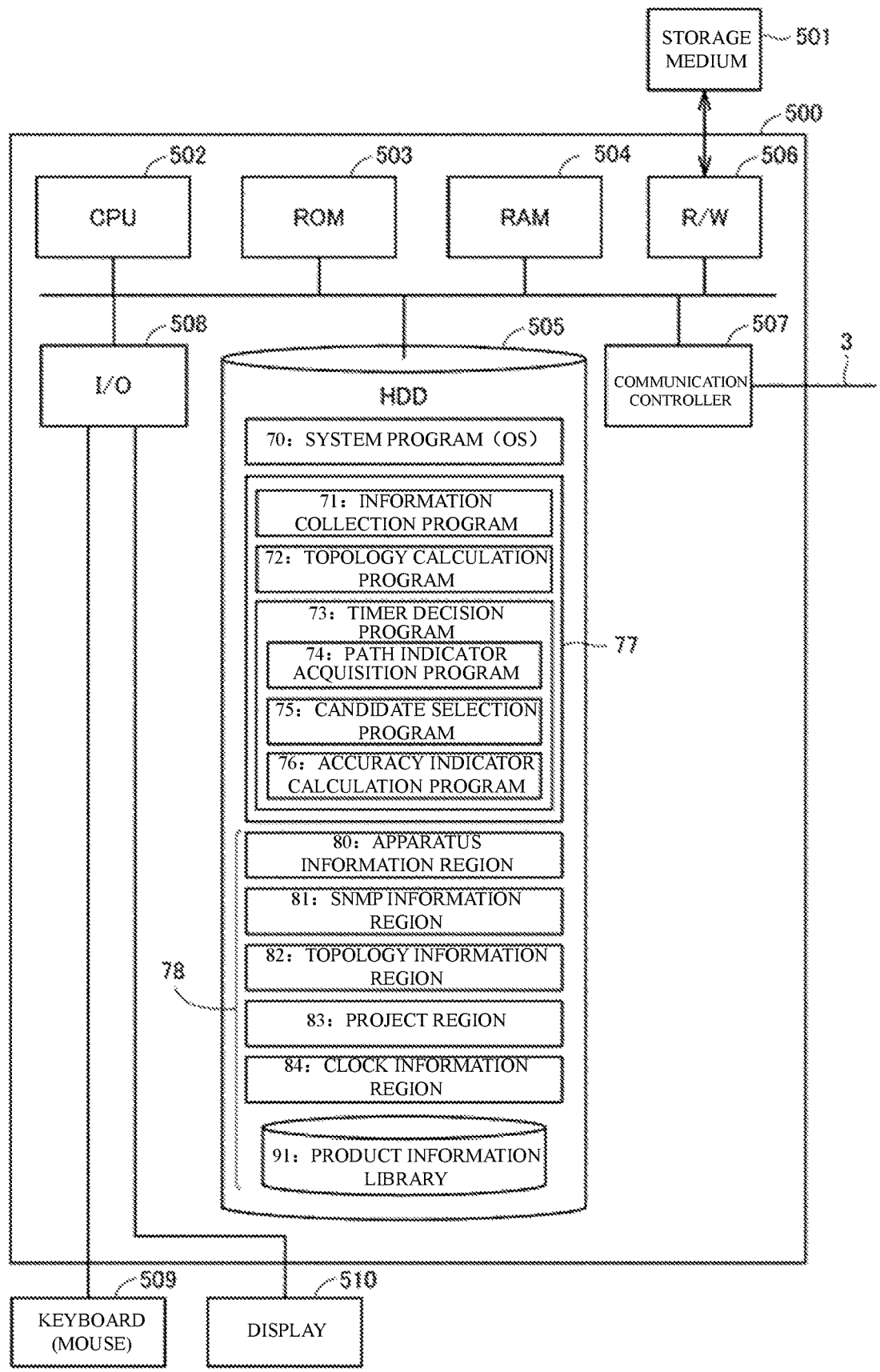
FIG. 4 is a diagram illustrating an overview of a configuration of a support apparatus 500 according to the present embodiment.

FIG. 4 is a diagram illustrating an overview of the configuration of the support apparatus 500 according to the present embodiment. Referring to FIG. 4, the support apparatus 500 is a computer system that includes a central processing unit (CPU) 502 and a storage unit that stores programs and data and operates in accordance with the programs. The storage unit includes a read only memory (ROM) 503, a random access memory (RAM) 504, and a hard disk drive (HDD) 505. The support apparatus 500 further includes a communication controller 507 and an input/output (I/O) interface 508. The support apparatus 500 further includes a keyboard 509 and a display 510. The keyboard 509 receives inputs including user's instruction for the support apparatus 500. In order to receive the inputs, the support apparatus 500 may include other devices such as a mouse. The display 510 includes a liquid crystal display (LCD) or an organic electro luminescence (EL) and displays information output from the support apparatus 500. The support apparatus 500 includes a reader/writer 506 (abbreviated as an R/W 506 in the drawing), to which an external storage medium 501 is detachably attached, which reads and writes programs and/or data from and in the attached storage medium 501.

The communication controller 507 controls communication between the support apparatus 500 and an external device via the cable 3. The communication controller 507 is configured to include a network interface card (NIC), for example. The I/O interface 508 (abbreviated as an I/O 508 in the drawing) controls exchange of data among the CPU 502, the keyboard 509, and the display 510.

The HDD 505 includes regions for storing a system program 70 including an operating system (OS), a tool program 77 constituting the support tool, and an information group 78 including a product information library 91. The product information library 91 includes the name of the apparatus and information regarding the apparatus corresponding to each of the plurality of apparatuses that can be connected to the network 2. The information related to the apparatus includes information indicating which of a switch or an end point as a control target the apparatus is, whether the apparatus is a controller among switches, and whether the apparatus is a motion control targets among the control targets. Such information is indicated using flags, for example.

The region for the information group 78 further includes an apparatus information region 80 for storing the apparatus information 604, an SNMP information region 81 for storing the SNMP information 603, a topology information region 82 for storing the topology information 30, a project region 83 for storing a project 60 (FIG. 14), and a clock information region 84 for storing the clock information 605.

The tool program 77 provides a setting method for setting information related to the grand master in the control system 1. Specifically, the tool program 77 includes an information collection program 71, a topology calculation program 72, and a timer decision program 73 for deciding a timer of the grand master. The timer decision program 73 includes a path indicator acquisition program 74, a candidate selection program 75 for selecting timers as candidates of the grand master from among the plurality of timers 101 using the project 60, and an accuracy indicator calculation program 76. The accuracy indicator calculation program 76 calculates an accuracy indicator indicating an indicator of time accuracy for deciding the grand master from the candidate timers using the clock information 605.

The information collection program 71 is executed to thereby transmit an information request 602, receive the SNMP information 603, the apparatus information 604, and the clock information 605 as responses to the request, and store the received information in each of the SNMP information region 81, the apparatus information region 80, and the clock information region 84.

The topology calculation program 72 is executed to thereby analyze the SNMP information 603 and the apparatus information 604 in the SNMP information region 81 and the apparatus information region 80 using information in the product information library 91, calculates the topology information 30 (FIG. 10) on the basis of the analysis result, and stores the calculated topology information 30 in the topology information region 82.

E. Software Configuration of Support Apparatus 500

Figure 5:
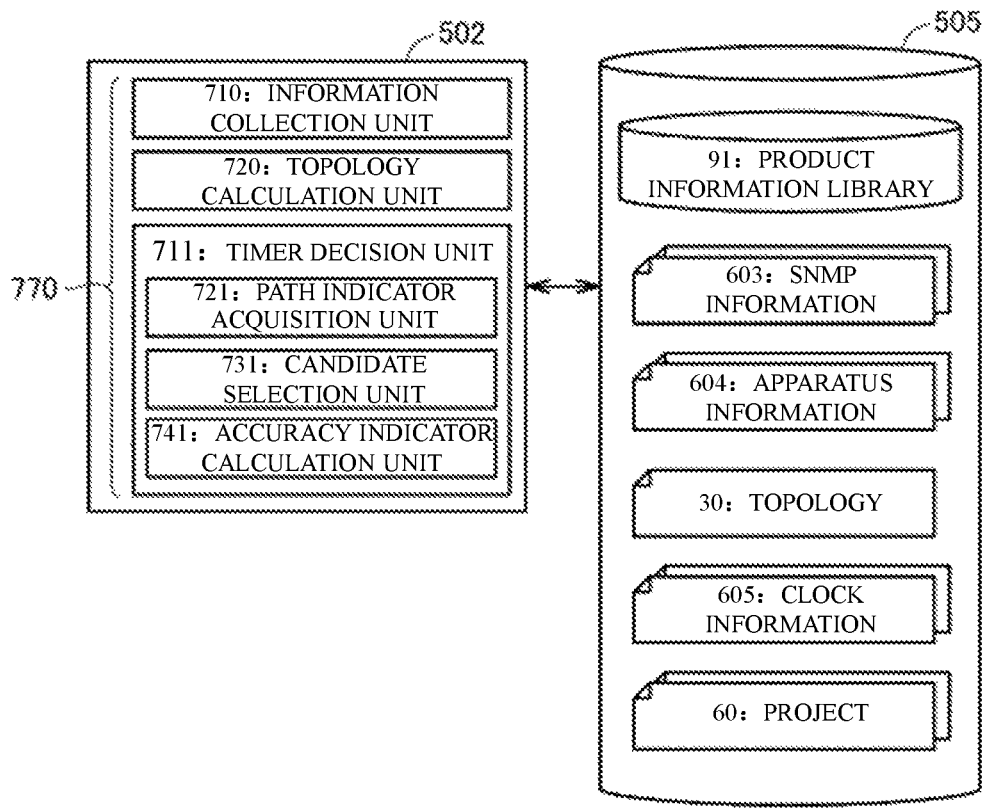
FIG. 5 is a diagram schematically illustrating a software configuration of the support apparatus 500 according to the present embodiment.

FIG. 5 is a diagram schematically illustrating a software configuration of the support apparatus 500 according to the present embodiment. FIG. 5 illustrates functions of the support tool 770 provided by the tool program 77 illustrated in FIG. 4 being executed by the CPU 502 under the system program 70, along with related information stored in the HDD 505.

The functions of the support tool 770 include an information collection unit 710, a topology calculation unit 720, and a timer decision unit 711 corresponding to the information collection program 71, the topology calculation program 72, and the timer decision program 73, respectively. The timer decision unit 711 includes a path indicator acquisition unit 721, a candidate selection unit 731, and an accuracy indicator calculation unit 741 corresponding to the path indicator acquisition program 74, the candidate selection program 75, and the accuracy indicator calculation program 76, respectively.

F. Overall Processing Flow

Figure 6:
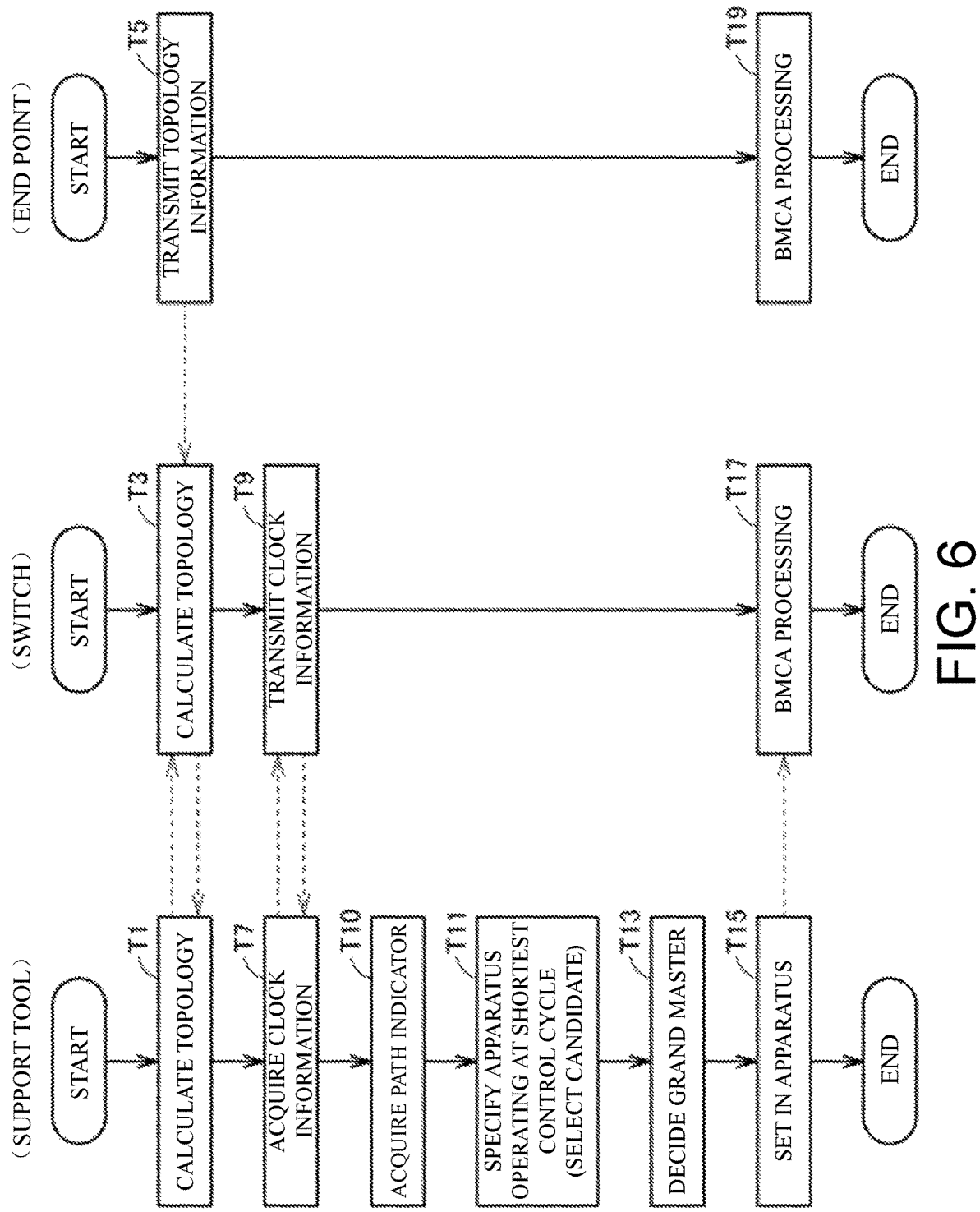
FIG. 6 is a flowchart illustrating an overview of an example of overall processing according to the present embodiment.

FIG. 6 is a flowchart illustrating an overview of an example of overall processing according to the present embodiment.

Referring to FIG. 6, if the support tool 770 is activated in the support apparatus 500, the topology calculation unit 720 calculates the topology information 30 (Step T1). Specifically, the information collection unit 710 collects the SNMP information 603 and the apparatus information 604 from the switches 100 and the end points 200 connected to the network 2 (Steps T3 and T5). The topology calculation unit 720 performs processing of calculating the topology information 30 (FIG. 8) from the SNMP information 603 and the apparatus information 604 collected. The switches 100 may calculate topology information related to the switches using the apparatus information 604 from the end points 200 to which the switches 100 are connected and transfer the topology information to the support apparatus 500.

The information collection unit 710 acquires the clock information 605 from each switch 100 connected to the network 2 (Steps T7 and T9).

The path indicator acquisition unit 721 analyzes the aforementioned calculated topology information 30 and acquires, for each switch 100, a path indicator indicating the length of the path or the distance of the path in the network 2 through which the control data passes until arrival at the end point 200 from the switch 100 on the basis of a result of the analysis (Step T10). In the present embodiment, the path indicator indicates a hop number that is the number of apparatuses through which the data (such as control data) from the switch 100 passes until arrival at the end point 200, for example.

The candidate selection unit 731 selects one or more candidates of the grand master (Step T11). Specifically, the candidate selection unit 731 selects one or more timers 101 as candidates of the grand master from among the timers of one or more transfer apparatuses with the path indicators indicating that the paths to arrive one or more end points 200 have the predetermined length. Alternatively, the candidate selection unit 731 selects, as candidates, the timers 101 of one or more controllers that control targets at the shortest cycle from among the controllers of the switches 100 including the one or more candidate timers 101 selected on the basis of the path indicators.

The timer decision unit 711 decides a grand master from among one or a plurality of candidates of the grand master (Step T13). Specifically, the accuracy indicator calculation unit 741 calculates, for each of the one or more timers 101 selected as the candidates, an accuracy indicator indicating accuracy of clock time synchronization from time accuracy of the timer 101 and the path indicator of the controller including the timer 101. The timer decision unit 711 decides a candidate with the accuracy indicator indicating the best accuracy as a grand master from among the one or more candidates (timers 101).

The timer decision unit 711 transmits the priority setting information 601 for setting the timer 101, which has been decided as a grand master, to be a grand master to the timer 101 (Step T15). Thereafter, the switches 100 and the end points 200 connected to the network 2 perform BMCA processing (FIG. 16), for example, to specify the grand master (Steps T17 and T19).

After the SNMP information 603, the apparatus information 604, and the clock information 605 are acquired, the support apparatus 500 may be separated from the control system 1, decide the grand master using the acquired information, and output the priority setting information 601 for setting the decided grand master to the control system 1.

In the present embodiment, the timer decision unit 711 may decide the grand master from among the timers 101 of the switches 100 without selecting the candidate timers 101. Specifically, the timer decision unit 711 may decide the grand master on the basis of the aforementioned accuracy indicator calculated for each timer 101. For example, the timer decision unit 711 may decide the timer 101 with the accuracy indicator indicating the best accuracy as the grand master.

The support apparatus 500 may include a mode in which the grand master is decided from among the aforementioned candidate timers 101 and a mode in which the grand master is decided on the basis of the accuracy indicators from among the timers 101 of the switches 100 without selecting the candidate timers 101, and may decide the grand master in accordance with the mode after switching when the support apparatus 500 is switched to any one of the modes. The support apparatus 500 performs such mode switching in response to a user's operation received from the keyboard 509, for example.

G. Topology and Path Indicator Considering Control Target

In the present embodiment, a grand master is decided to secure clock time synchronization accuracy for a control target of a type that requires clock time synchronization with high accuracy as a control target.

(G1. Example of Topology Considering Control Targets)

Figure 7:
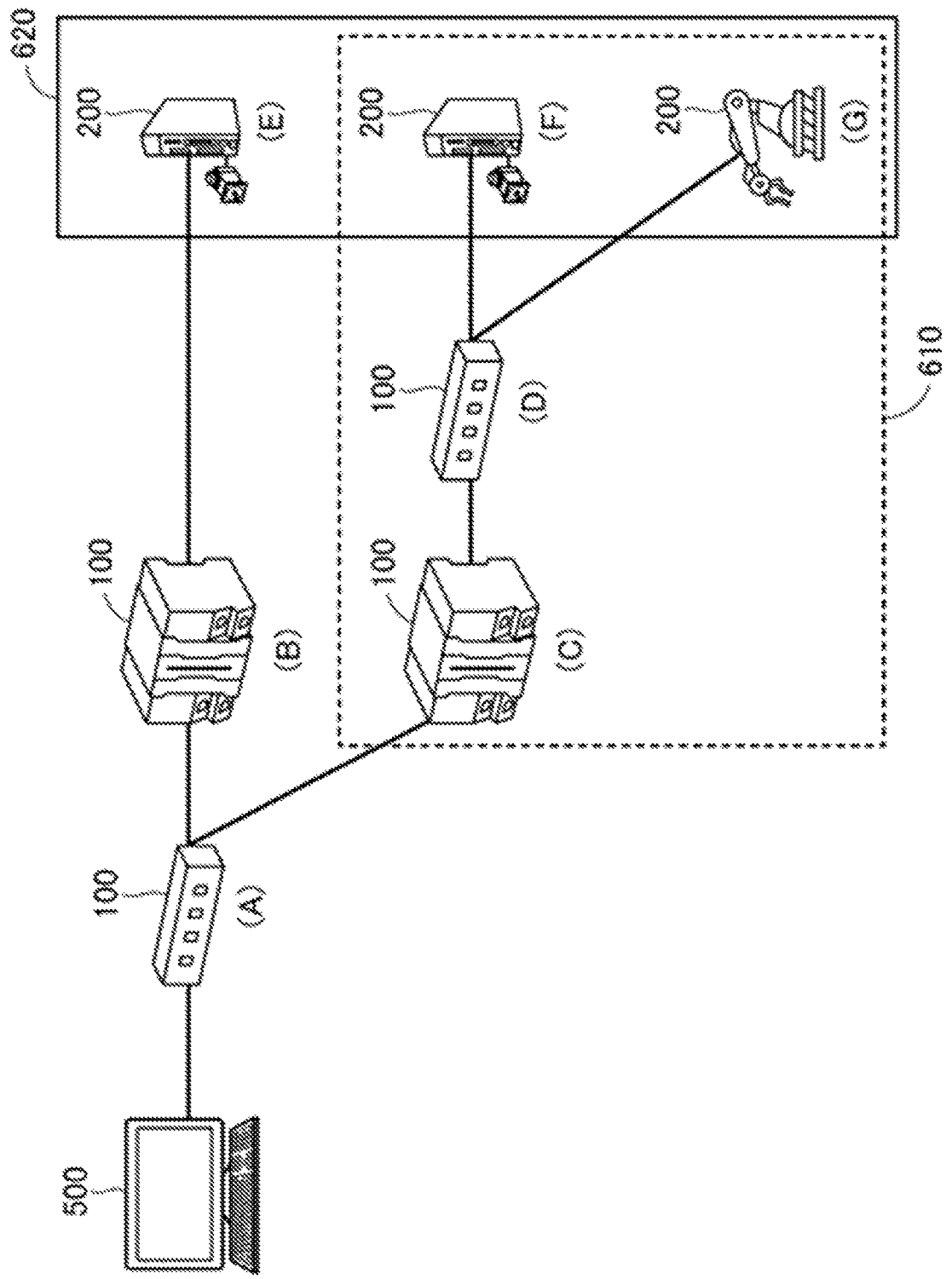
FIG. 7 is a diagram schematically illustrating an example of topology considering control targets according to the present embodiment.

FIG. 7 is a diagram schematically illustrating an example of topology considering control targets according to the present embodiment. As the topology in FIG. 7, topology mainly including control targets of a type that requires clock time synchronization with high accuracy as control targets, that is, the end points 200 (illustrated as end points (E), (F), and (G) in the drawing) of motion control targets 620 is illustrated. The topology includes switches 100 (illustrated as switches (A), (B), (C), and (D) in the drawing) connected to the end points (E), (F), and (G). Moreover, the switches (B) and (C) correspond to controllers that execute a motion control program of the motion control targets 620 in the topology in FIG. 7, and the controller of the switch (C) out of the switches (B) and (C) executes the motion control program at the shortest cycle.

In the present embodiment, an apparatus connected to a path from the controller that executes the motion control program of the motion control target 620 at the shortest cycle from among the controllers to the corresponding control target (end point 200) will be referred to as a "related apparatus 610 of the shortest cycle control". In the present embodiment, one or a plurality of timers 101 that the switch 100 (more specifically, the controller) of the related apparatus 610 of the shortest cycle control has can be selected as candidate timers.

(G2. SNMP Information and Topology Information Considering Control Target)

FIG. 8 is a diagram schematically illustrating an example of the SNMP information 603 according to the present embodiment. FIG. 9 is a diagram schematically illustrating an example of the topology information 30 according to the present embodiment.

The SNMP information 603 in FIG. 8 includes SNMP information 20A, 20B, 20C, and 20D of the switches (A) to (D) in the topology in FIG. 7. Referring to FIG. 8, the SNMP information 20A, 20B, 20C, and 20D includes, as corresponding apparatus information, information regarding apparatus data 21, apparatus names 22, corresponding port identifiers (IDs) 23 of apparatus ports, and other apparatuses connected to the ports (apparatus data 24, other apparatus names 25, and port IDs 26).

The apparatus data 21 and 24 includes both MAC addresses and IP addresses. The port IDs 26 of the other apparatuses indicate port of other apparatuses connected to the ports of the corresponding port IDs 23. According to the SNMP information 603 in FIG. 9, a "port 1" of the switch (D) is connected to a "port 2" of the switch (C).

Figure 10:
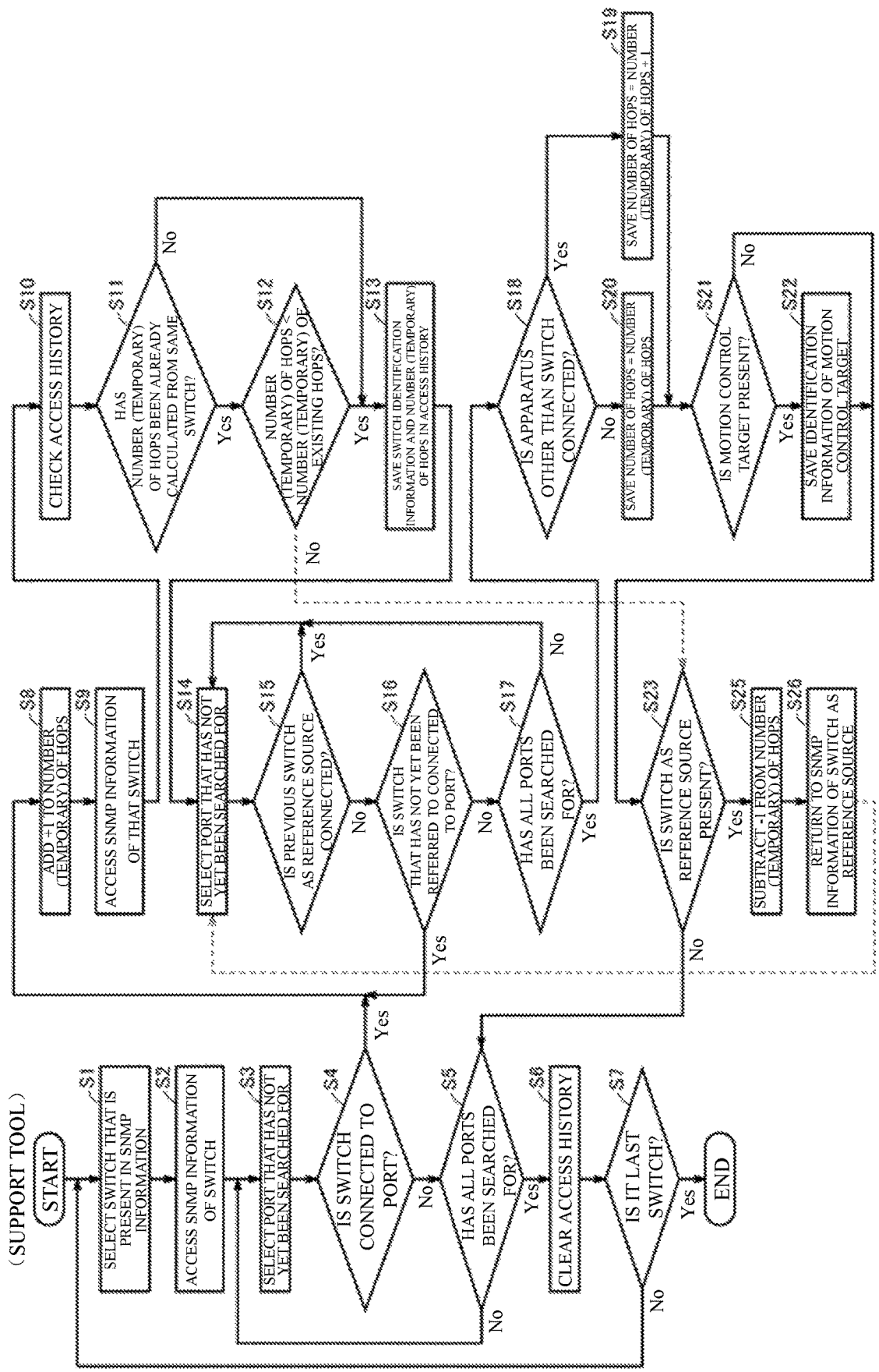
FIG. 10 is a flowchart illustrating an example of topology information calculation processing considering control targets according to the present embodiment.

The topology information 30 in FIG. 9 indicates information calculated from the SNMP information 603 in FIG. 8, for example. Referring to FIG. 9, the topology information 30 includes topology information 30A, 30B, 30C, and 30D corresponding to the SNMP information 20A, 20B, 20C, and 20D of the switches (A) to (D). Referring to FIG. 10, each piece of the topology information 30A, 30B, 30C, and 30D includes the number 31 of hops corresponding to a motion control target 32 (each of the end points (E), (F), and (G)).

(G3. Topology Information Calculation Processing Considering Control Targets)

Figures 11, 12:
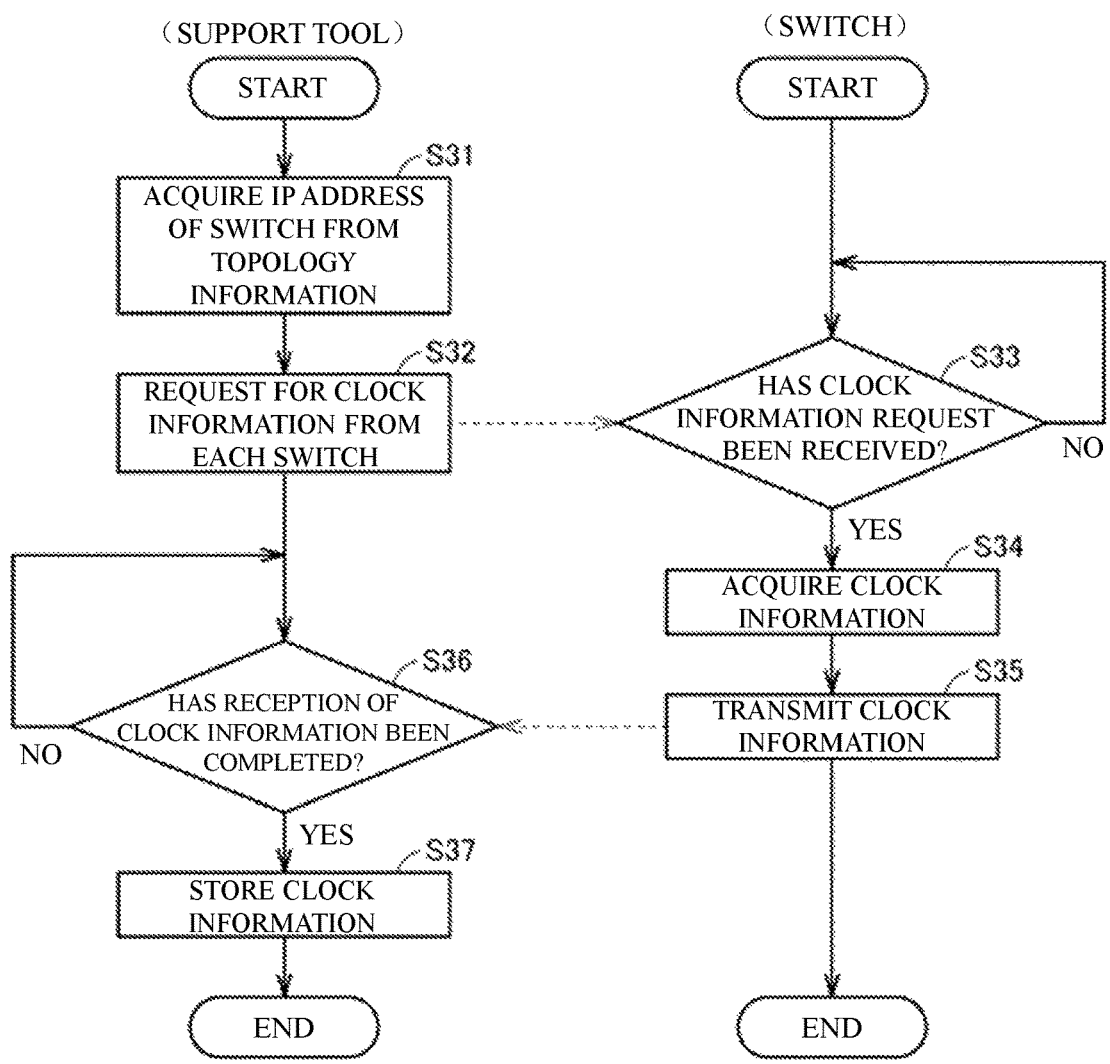
FIG. 11 is a diagram illustrating an example of an access history 611 referred to in the processing in FIG. 10.
FIG. 12 is a flowchart illustrating an example of processing acquiring clock information 605 according to the present embodiment.

FIG. 10 is a flowchart illustrating an example of topology information calculation processing considering control targets according to the present embodiment. FIG. 11 is a diagram illustrating an example of an access history 611 referred to in the processing in FIG. 10. Referring to FIG. 11, the access history 611 has a table format corresponding to each port of the switch and including identification information 608 of other switches connected to the port and the number 609 of hops as a temporary value. The number 609 of hops is referred to as a temporary value during calculation in the processing in FIG. 10. Information regarding the access history 611 in FIG. 11 indicates an example of a value calculated in a case in which the topology calculation unit 720 searches for the SNMP information 20A of the switch (A) in FIG. 8, for example. The topology calculation unit 720 can detect a ring topology, which will be described later, on the basis of the access history 611.

Referring to FIG. 10, the topology calculation unit 720 calculates topology from the SNMP information of the apparatus connected to the output port of each switch 100 of the SNMP information 603. Specifically, the topology calculation unit 720 selects and accesses one piece of SNMP information out of the SNMP information 603 (Step S1). For example, the topology calculation unit 720 searches for the product information library 91 on the basis of the apparatus names 22 and 25 of the SNMP information 603 and accesses the SNMP information including the names 22 and 25 of the apparatuses that are switches in order on the basis of the search result (Step S2). In FIG. 8, the SNMP information 20A to 20D in which the apparatus names 22 and 25 are a "product name A", a "product name B", a "product name C", and a "product name D", for example, become targets of access in order. The order of the access is not limited thereto. The topology calculation unit 720 calculates the topology information 30 by searching for (operating) information of the port IDs 23 and 26 from the SNMP information of the access targets.

First, the topology calculation unit 720 selects an unsearched port from SNMP information of a certain switch as a processing target port (Step S3), determines whether all ports have been searched for (Step S5) if it is determined that the switch is not connected to the selected target port (NO in Step S4), and returns to Step S3 if it is determined that all the ports have not been searched for (NO in Step S5). If it is determined that all the ports have been searched for (YES in Step S5), the topology calculation unit 720 clears the access history (FIG. 11) used in the searching for the port of the switch (Step S6), and determines whether the SNMP information of all the switches have been processed (Step S7). If it is determined that the processing of the SNMP information of all the switches has not ended (NO in Step S7), the topology calculation unit 720 returns to Step S1 and starts processing of the SNMP information of the next access target. If it is determined that the processing of the SNMP information of all the switches has ended (YES in Step S7), the topology calculation unit 720 ends the processing.

If it is determined that a switch is connected to the selected target port (YES in Step S4), the topology calculation unit 720 adds +1 to the number (temporary) 609 of hops, which is a temporary variable (Step S8), accesses SNMP information of the access target switch (Step S9), and checks (scans) a corresponding access history 611 (Step S10).

The topology calculation unit 720 determines whether the number (temporary) of hops from the same switch has already been calculated, on the basis of information (the identification information 608 and the number (temporary) 609 of the hops) corresponding to the target port in the access history 611 (Step S11). If it is determined that the number (temporary) 609 of hops from the same switch has not been calculated (NO in Step S11), the topology calculation unit 720 saves the identification information 608 of the switch and the number (temporary) 609 of hops (the value calculated in Step S8) as information of the target port in the access history 611 (Step S13). Thereafter, the procedure proceeds to Step S14.

If it is determined that the number (temporary) of hops from the same switch has been calculated (YES in Step S11), the topology calculation unit 720 performs determination in a case of ring topology in Step S12. Specifically, since the topology information is calculated in a repeated manner in the case of ring topology, the topology calculation unit 720 determines whether the condition that (the number (temporary) of hops calculated in Step S8<the number (temporary) 609 of exiting hops of the access history 611) is satisfied, in order to avoid such repeated calculation (Step S12). If it is determined that the condition is satisfied (YES in Step S12), the topology calculation unit 720 selects information of the smaller number of hops (the number (temporary) of hops calculated in S8) as true. Specifically, the topology calculation unit 720 stores the switch identification information and the number (temporary) of hops in an associated manner with the access history 611 (Step S13).

If it is determined that the aforementioned condition is not satisfied (NO in Step S12), that is, in a case in which it is determined that the condition of the number (temporary) of hops the number (temporary) of existing hops is satisfied, the topology information that has already been calculated is true, and it is not necessary to calculate the topology information again, and the topology calculation unit 720 thus moves on to Step S23 and returns to the switch as a reference source.

In Step S14, the topology calculation unit 720 selects an unsearched port of the switch (Step S14), and the topology calculation unit 720 determines whether the switch is connected to the selected target port. Specifically, the topology calculation unit 720 determines whether the switch as a reference source is connected to a previous port of the target port (Step S15), and the topology calculation unit 720 returns to Step S14 if it is determined that the switch as a reference source is connected (YES in Step S15), or the topology calculation unit 720 determines whether the switch that has not yet been referred to is connected to the target port (Step S16) if it is determined that the switch as the reference source is not connected (NO in Step S15). The topology calculation unit 720 returns to Step S8 if it is determined that the switch that has not yet been referred to is connected to the target port (YES in Step S16), or the topology calculation unit 720 determines whether all the ports for the switch have been searched for (Step S17) if it is determined that the switch that has not yet been referred to is not connected to the target port (NO in Step S16). The topology calculation unit 720 moves on to Step S18, which will be described later, if it is determined that all the ports for the switch have been searched for (YES in Step S17), or the topology calculation unit 720 returns to Step S14 if it is determined that all the ports for the switch have not been searched for (NO in Step S17).

In Step S18, the topology calculation unit 720 determines whether an apparatus (that is, an end point 200) other than the switch is connected to the switch (Step S18). The topology calculation unit 720 saves the number 31 of hops=the number (temporary) 609 of hops+1 in the topology information 30 (Step S19) if it is determined that an apparatus other than the switch is connected (YES in Step S18), or the topology calculation unit 720 saves the number 31 of hops=the number (temporary) 609 of hops in the topology information 30 (Step S20) and then moves on to Step S21 if it is determined that an apparatus other than the switch is not connected (NO in Step S18).

The topology calculation unit 720 determines whether an apparatus as a motion control target is present (S21), and the topology calculation unit 720 saves identification information of the motion control target in the topology information 30 (Step S22) if it is determined that the apparatus that is the motion control target is present (YES in Step S21), or the topology calculation unit 720 moves on to Step S23 if it is determined that the apparatus that is the motion control target is not present (NO in Step S21).

The topology calculation unit 720 determines whether a switch as a reference source is present (Step S23), and the topology calculation unit 720 moves on to Step S5 if it is determined that the switch as the reference source is not present (NO in Step S23), or the topology calculation unit 720 subtracts one from the number (temporary) 609 of hops (Step S25) and returns to SNMP information of the switch as the reference source (Step S26) if it is determined that the switch as the reference source is present (YES in Step S23).

The topology calculation unit 720 can generate topology information 30A to 30D (FIG. 9) for each switch from the information in the access history 611 corresponding to each piece of the SNMP information 20A to 20D (FIG. 8) of each switch generated in the processing in FIG. 10.

H. Acquisition of Clock Information 605

FIG. 12 is a flowchart illustrating an example of processing for acquiring the clock information 605 according to the present embodiment. In Steps T7 and T9 in FIG. 6, the information collection unit 710 receives the clock information 605 from each apparatus in the network 2 and stores the received clock information 605 in the clock information region 84.

Specifically, the information collection unit 710 acquires an IP address of each switch 100 from the topology information 30 (Step S31). The information collection unit 710 transmits an information request 602 for requesting transmission of the clock information 605 to each switch 100 using the acquired IP address (Step S32).

The network controller 110 of each switch 100 determines whether the information request 602 for the clock information 605 has been received (Step S33). The network controller 110 repeats Step S33 if it is determined that the information request 602 for the clock information 605 has not been received (NO in Step S33), or the network controller 110 acquires the clock information (clock accuracy) 605 of the timer 101 (Step S34) and transmits the acquired clock information 605 to the support apparatus 500 (Step S35) if it is determined that the information request 602 has been received (YES in Step S33).

The support apparatus 500 determines whether reception of the clock information 605 has been completed as a response from all the switches 100 (Step S36). Step S36 is repeated if it is determined that reception has not been completed (NO in Step S36), or the received all pieces of clock information 605 are stored in the HDD 505 (Step S37) if it is determined that reception has been completed (YES in Step S36). In this manner, the information collection unit 710 of the support apparatus 500 can collect the clock information 605 of all the switches 100.

I. Detection of Related Apparatus 610 of Shortest Cycle Control

Figure 13:
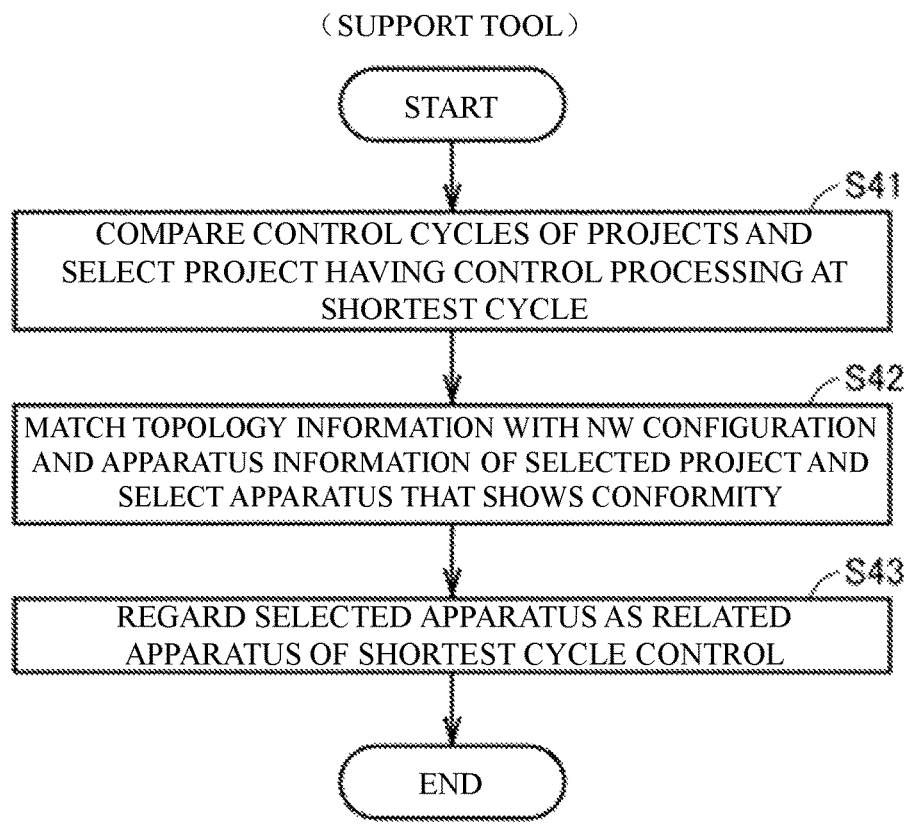
FIG. 13 is a flowchart illustrating an example of processing for detecting a related apparatus 610 of shortest cycle control according to the present embodiment.
Figure 14:
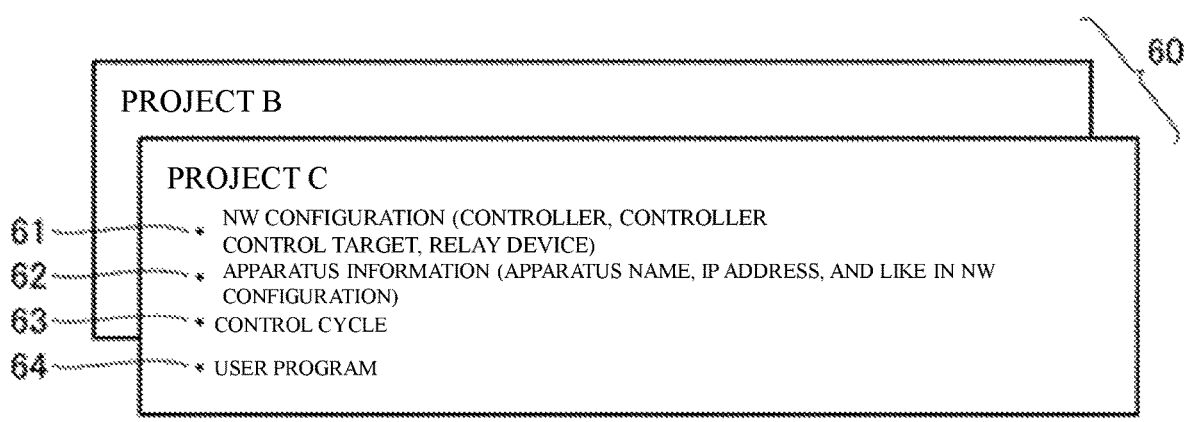
FIG. 14 is a diagram schematically illustrating an example of a project 60 according to the present embodiment.

FIG. 13 is a flowchart illustrating an example of processing for detecting the related apparatus 610 of the shortest cycle control according to the present embodiment. The detection processing is performed by the candidate selection unit 731 using the project 60 of each controller. FIG. 14 is a diagram schematically illustrating an example of the project 60 according to the present embodiment.

Referring to FIG. 14, the project 60 corresponding to each controller stored in the HDD 505 of the support apparatus 500 includes a user program 64 including a network (NW) configuration (information regarding a controller, a controller control target, a relay device, and the like) 61, apparatus information (a name, an IP address, and the like corresponding to each apparatus included in the NW configuration 61) 62, a control cycle 63 that each controller of the NW configuration 61 has, and a control program executed in synchronization with the control cycle 63.

Referring to FIG. 13, the candidate selection unit 731 compares the control cycles 63 of the projects 60 of the controllers and selects a project 60 with the control cycle 63 indicating the shortest cycle on the basis of a result of the comparison (Step S41).

The candidate selection unit 731 matches the topology information 30 with the NW configuration 61 and the apparatus information 62 of the selected project 60 and selects apparatus information that conforms to the NW configuration 61 and the apparatus information 62 from the topology information 30 on the basis of a result of the matching (Step S42). Specifically, the apparatuses (the switches 100, the end points 200) with the apparatus names 22 and 24 and the apparatus data 21 and 24 (IP addresses) that conform to the NW configuration 61 and the apparatus information 62 are decided as the related apparatuses 610 of the shortest cycle control on the basis of a result of the matching (Step S43).

J. Selection of Candidates and Decision of Grand Master

Figure 15:
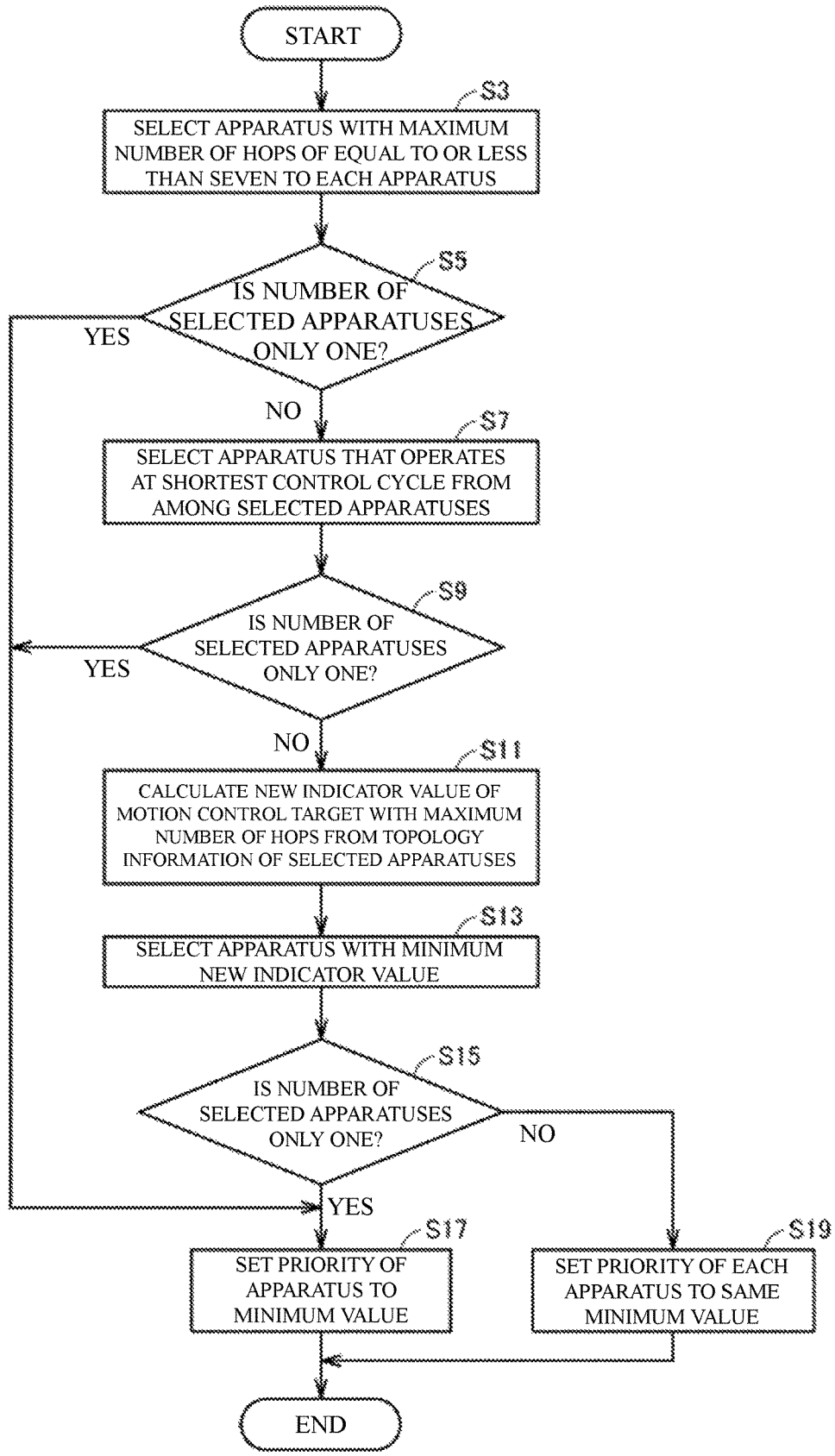
FIG. 15 is a flowchart illustrating an example of processing for selecting candidates of a grand master and deciding the grand master according to the present embodiment.

FIG. 15 is a flowchart illustrating an example of selecting candidates of a grand master and deciding the grand master according to the present embodiment.

Referring to FIG. 15, the timer decision unit 711 decides (detects) the grand master from the related apparatuses 610 of the shortest cycle control (Step T13 in FIG. 6). Specifically, the timer decision unit 711 selects, for each end point 200 of the topology information 30, an apparatus (switch 100) with the number of hops that is equal to or less than the maximum number of hops to the end point (Step S3). The maximum number of hops indicates the maximum number of hops with which the clock time synchronization protocol can secure the clock time synchronization. For example, the maximum number of hops is "seven" if the clock time synchronization protocol is IEEE 802.1AS. Although the maximum number of hops is not limited in the present embodiment, the maximum number of hops is defined as, for example, "seven".

The timer decision unit 711 determines whether or not the number of selected apparatuses is one (Step S5). If it is determined that the number of selected apparatuses is one (YES in Step S5), the timer decision unit 711 transmits priority setting information 601 having a command for setting priority 606 of the apparatus itself in a region 1042 of the selected apparatus (switch 100) to a predetermined minimum value (Step S17). The selected apparatus (switch 100) sets the priority 606 of the apparatus itself in the region 1042 to the predetermined minimum value in accordance with the command of the priority setting information 601 from the timer decision unit 711.

The timer decision unit 711 selects the related apparatus 610 of the shortest cycle control from the selected apparatuses (Step S7). The timer decision unit 711 determines whether or not the number of related apparatuses 610 of the shortest cycle control is one (Step S9). If it is determined that the number of selected apparatuses is one (YES in Step S9), the timer decision unit 711 performs processing in Step S17. On the other hand, when the timer decision unit 711 determines that the number of selected apparatuses is not one, that is, the timer decision unit 711 determines that a plurality of apparatuses (switches 100) have been selected (NO in Step S9), the accuracy indicator calculation unit 741 calculates accuracy indicator values (Step S11).

Specifically, the accuracy indicator calculation unit 741 calculates new indicator values of motion control targets with the maximum number of hops from the topology information of the plurality of selected apparatuses (switches 100) (Step S11). Specifically, the accuracy indicator calculation unit 741 calculates the new indicator values from the numbers of hops and variations (clock time correction error) of clock time correction and uses the new indicator values as determination indicators for selecting the grand master with higher priority than the existing parameters. As an equation for calculating the new indicator values, it is possible to apply, for example, (the new indicator value=clock accuracy indicated by the clock information 605 of the target apparatus+(a clock time correction error to (the maximum number of hops−1))). The clock time correction error of each apparatus is regarded as a common value. Although the clock time correction error is not limited, the clock time correction error is defined as, for example, 100 nsec in the present embodiment. On the assumption that the maximum number of hops=7, for example, (the clock time correction error to (the maximum number of hops−1)) can be calculated as (7−1)×100 ns.

The timer decision unit 711 selects an apparatus with the smallest new indicator value from among the apparatuses (switches 100) selected in Step S7 (Step S13) and determines whether or not the number of selected apparatuses is one (Step S15). The timer decision unit 711 performs the aforementioned processing in Step S17 when it is determined that the number of selected apparatuses is one (YES in Step S15), or the timer decision unit 711 transmits the priority setting information 601 to a plurality of selected apparatuses (switches 100) (Step S19) when it is determined that the plurality of apparatuses have been selected (NO in Step S15). Each selected apparatus (switch 100) sets a predetermined minimum value as the priority 606 of the apparatus itself in the region 1042 in accordance with the command of the priority setting information 601 from the timer decision unit 711.

K. Processing of Detecting Apparatus Having High Accuracy Timer

Figure 16:
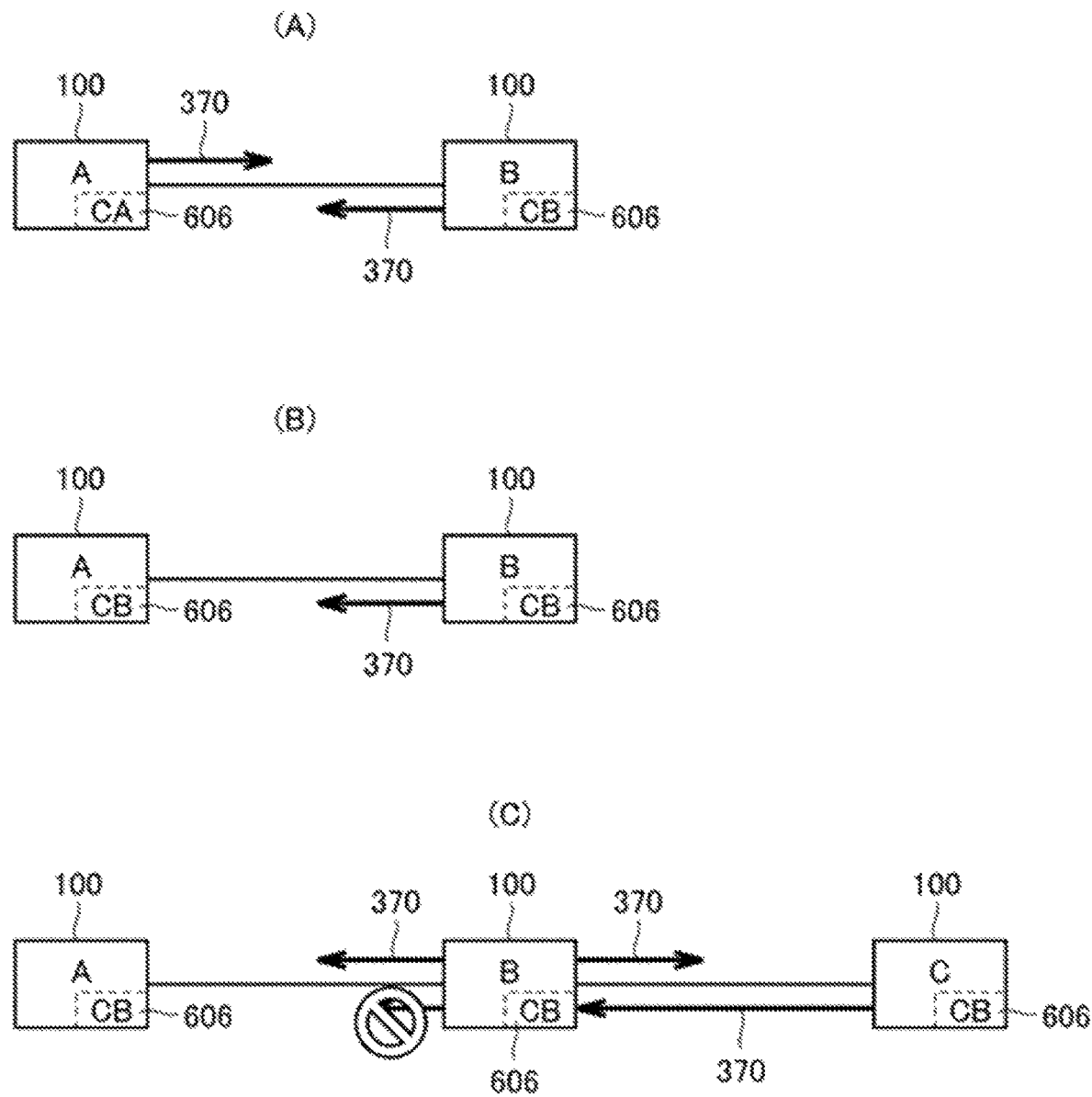
FIG. 16 is a diagram schematically illustrating an example of processing for autonomously detecting the grand master among apparatuses according to the present embodiment.

FIG. 16 is a diagram schematically illustrating an example of processing for autonomously detecting a grand master among apparatuses according to the present embodiment. The detection processing is performed in accordance with BMCA processing, for example.

FIG. 16 illustrates apparatuses "A" to "C" corresponding to the switches 100 or the end points 200, and among these, the timer 101 of the apparatus "B" is a grand master. In other words, the predetermined minimum value is set through the aforementioned processing in Step T11 in the priority 606 of the apparatus "B".

First, each apparatus operates to distribute the priority 606 of the apparatus itself to other apparatuses using an announcement message 370 with the timer 101 of the apparatus itself defined as a grand master when the operation is started in (A) of FIG. 16. Specifically, the processor 102 of the switch 100 stores the priority 606 of the apparatus itself in the region 1042 as priority 607 of the grand master in the region 1041 and transmits the announcement message 370 including the priority 606 of the apparatus itself.

Each apparatus compares values of the priority of the received announcement message 370 and of the priority 606 of the apparatus itself and determines whether the one of the priority 606 is higher than the other priority 606 on the basis of a result of the comparison. Specifically, in a case in which one priority value is less than the value of the other priority 606 as a result of the comparison, this indicates that the one priority 606 is higher than the other priority 606. In a case in which the value of one priority 606 is higher than the value of the other priority 606 as a result of the comparison, this indicates that the one priority 606 is lower than the other priority 606.

In (B) of FIG. 16, in a case in which it is determined that the priority 606 of other apparatuses is higher than the priority 606 of the apparatus itself on the basis of a result of the aforementioned comparison, each apparatus can overwrite the priority 606 of the received announcement message 370 on the priority 607 of the grand master in the memory (regions 1041 and 2041). In this case, the apparatus that has performed the overwriting is switched to a slave (the side on which the clock time information is received from the grand master) and stops distribution of the announcement message 370 of the apparatus itself.

In (B) of FIG. 16, the priority 606 of the apparatus "B" is higher than the priority 606 of the apparatus "A", for example. Therefore, the apparatus "A" is switched from a master to a slave and stops distribution of the announcement message 370.

In (C) of FIG. 16, in a case in which it is determined that the priority 606 of the announcement message 370 from other apparatuses is lower than the priority 606 that the apparatus itself has on the basis of a result of the comparison of the priority described above, each apparatus does not transfer the announcement message 370 to the next apparatus (discards the announcement message 370).

In (C) of FIG. 16, the priority 606 of the apparatus "B" is higher than the priority 606 of the apparatus "C", for example. Therefore, the apparatus "B" discards the announcement message 370 received from the apparatus "C". In this manner, the announcement message 370 from the apparatus "C" is not distributed to the next apparatus "A" via the apparatus "B". The apparatus "C" overwrites the priority 606 of the announcement message 370 from the apparatus "B" on the priority 607 of the grand master in the memory (regions 1041 and 2041) of the apparatus itself. In this manner, the apparatus "C" is switched from a master to a slave.

According to the BMCA processing in FIG. 16, only the apparatus with the priority 606 set to the predetermined minimum value by the timer decision unit 711, that is, the apparatus "B" can maintain the original master setting without being switched to a slave, and as a result, the timer 101 of the apparatus "B" becomes a grand master that distributes time information of itself.

L. Another Example of Network Configuration

Figure 17:
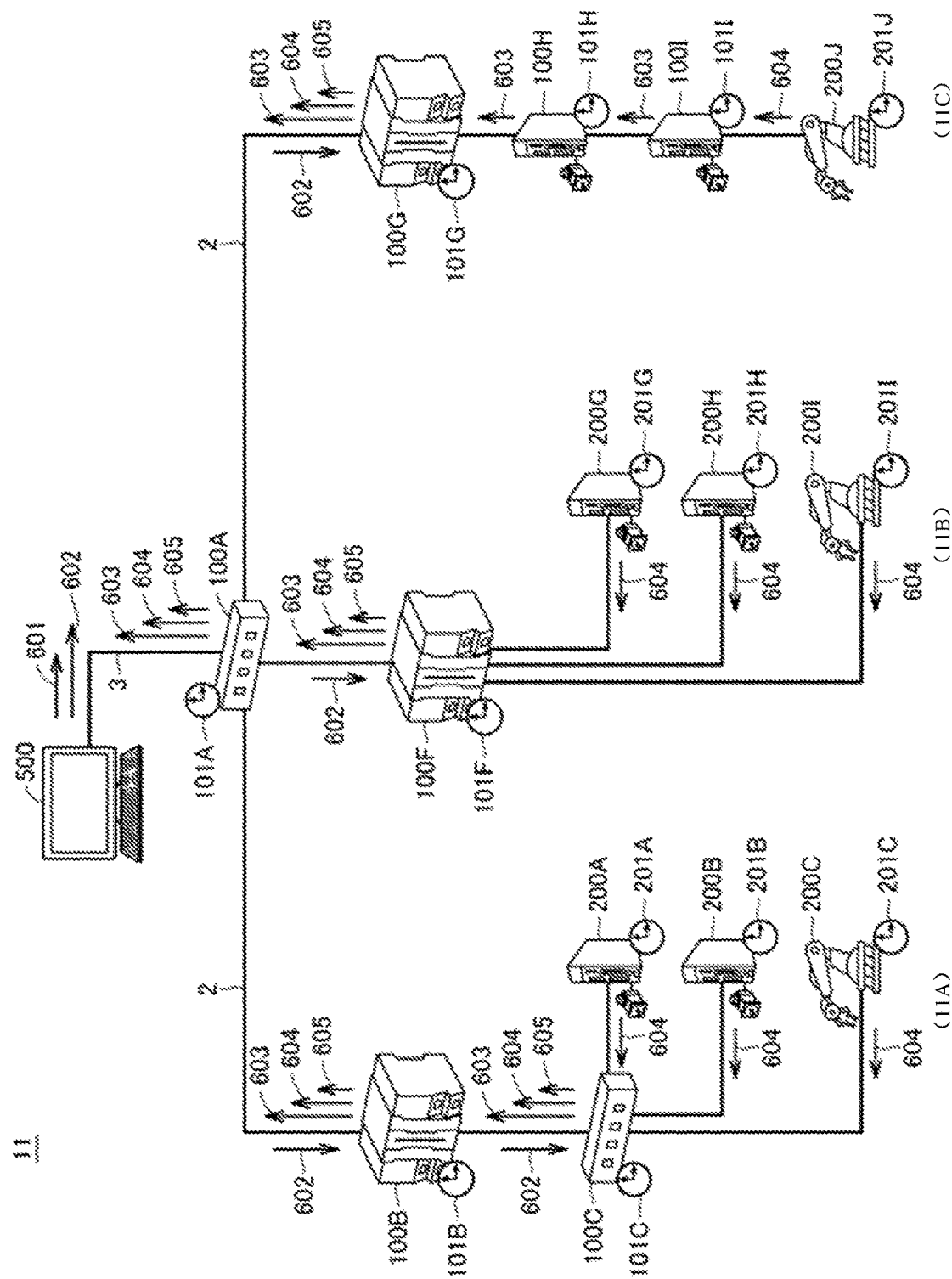
FIG. 17 is a diagram schematically illustrating another example of a network configuration according to the present embodiment.

FIG. 17 is a diagram schematically illustrating another example of the network configuration according to the present embodiment. In the network configuration of the control system 11 in FIG. 17, a basic configuration 11A, a configuration 11B of a multi-port controller, and a configuration 11C of daisy chain topology are connected to a switch 100A. Although the network configuration of the control system 1 includes only the basic configuration in FIG. 1, the network configuration of the control system is not limited to the configuration in FIG. 1 and may be the configuration in FIG. 17.

In the basic configuration 11A of the control system 11, an end point 200 is connected to a controller (switch 100B) via another switch 100 similarly to the configuration in FIG. 1. On the other hand, the configuration 11B includes a controller (switch 100F), and a plurality of end points 200 (200G, 200H, and 200I) are connected to multiple ports of the controller itself (without intervention of other switches). The switch 100F and the end points 200G, 200H, and 200I include timers 101F, 201G, 201H, and 201I, respectively.

Also, in the daisy chain topology configuration 11C, switches 100H and 100I and an end point 200J are connected to a controller (switch 100G) connected to the switch 100A through the daisy chain. The switches 100H and 100I and the end point 200J include timers 101G, 101H, 101I, and 201J, respectively. In addition, the switch 100H and the switch 100I also include a function of a controller that controls a control target. In a case in which the controller 100G is a product manufactured by a company that is different from a company that provides controller of the configuration 11A or the configuration 11C due to a change in network configuration, for example, there is a case in which a request for connection of a switch and an end point through the daisy chain is provided to the controller 100G.

(L1. Calculation of Topology Information Considering Control Targets)

Figure 18:
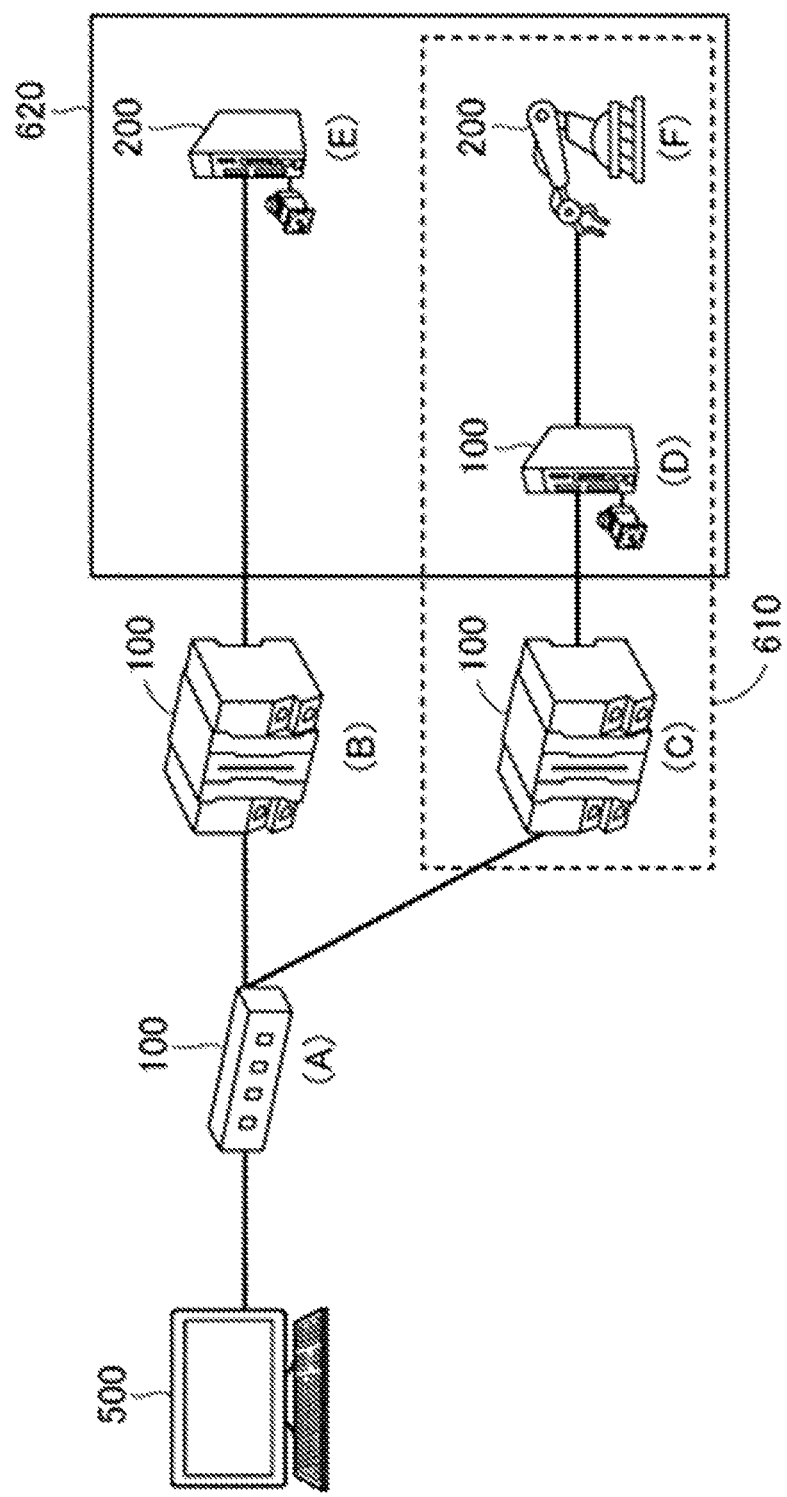
FIG. 18 is a diagram schematically illustrating another example of topology considering control targets according to the present embodiment.

FIG. 18 is a diagram schematically illustrating another example of topology considering control targets according to the present embodiment. As the topology in FIG. 18, topology mainly including apparatuses (illustrated as end points (E) and (F) and the switch (D) in the drawing) to which control targets of a type that requires clock time synchronization with high accuracy, that is, motion control targets 620 are connected as control targets is illustrated. Moreover, in the topology in FIG. 18, switches (A), (B), and (C) correspond to controllers capable of executing the motion control program of the motion control targets 620, and among these, the switches (C) and (D) execute the motion control program at the shortest control cycle. Therefore, in FIG. 18, the related apparatuses 610 of the shortest cycle control include the switches (C) and (D) and the end point (F), and one or a plurality of timers 101 that the related apparatuses 610 of the shortest cycle control have can be selected as candidate timers.

(L2. SNMP Information and Topology Information Considering Control Targets)

Figure 20:
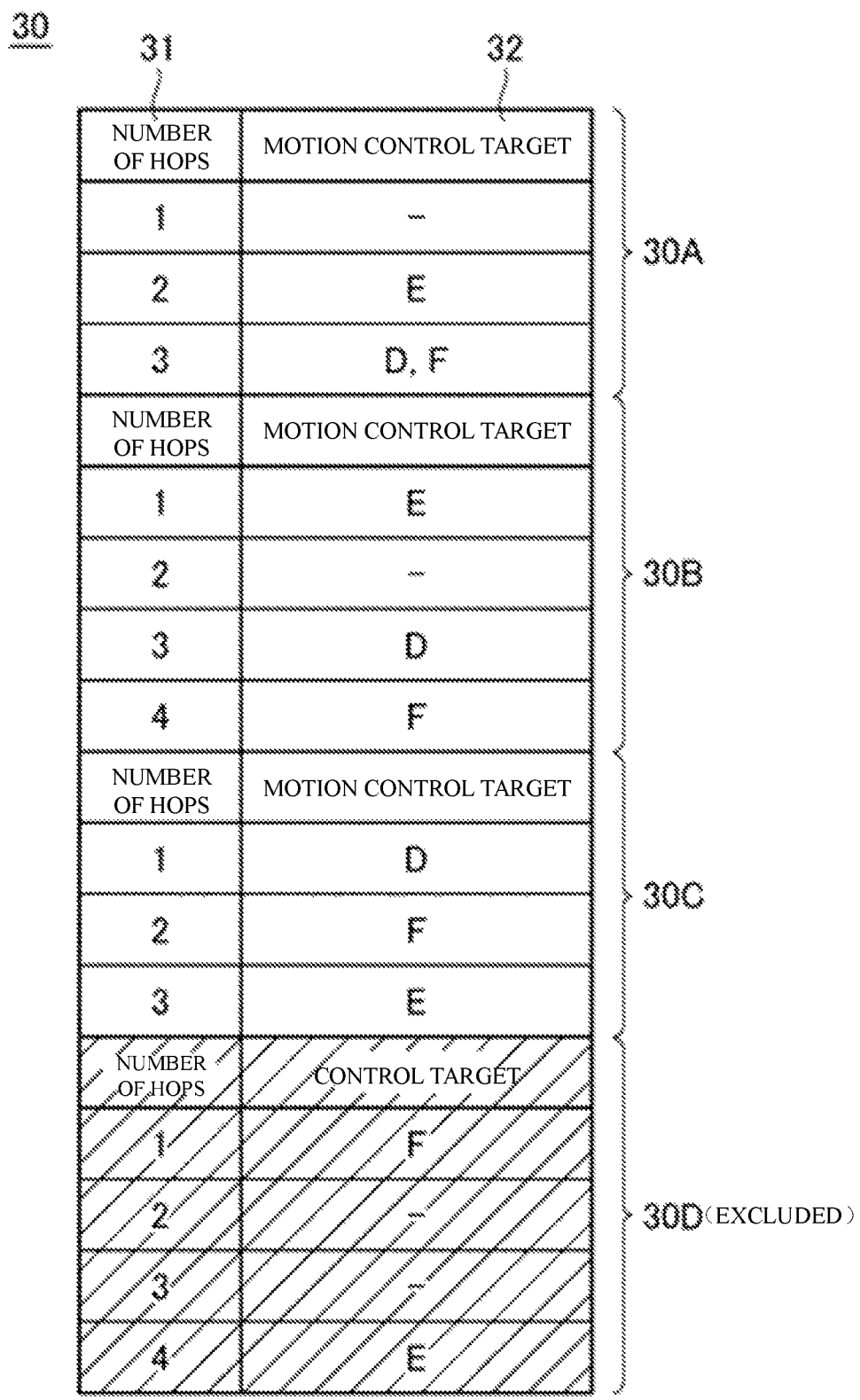
FIG. 20 is a diagram schematically illustrating another example of the topology information 30 according to the present embodiment.

FIG. 19 is a diagram schematically illustrating another example of the SNMP information 603 according to the present embodiment. FIG. 20 is a diagram schematically illustrating another example of the topology information 30 according to the present embodiment.

As the SNMP information 603 in FIG. 19, the SNMP information 603 received as a response to the information request 602 transmitted by the information collection unit 710 to the network configuration in FIG. 18 is illustrated. The SNMP information 603 in FIG. 19 includes SNMP information 20A, 20B, 20C, and 20D of switches (A) to (D) in the topology in FIG. 18. As the SNMP information 20D corresponding to the switch (D) in FIG. 19, information based on the switch (D) allowing only the end point (F) to be connected thereto is illustrated, unlike the SNMP information corresponding to the switch (D) in the topology information 903 in FIG. 8. Since the SNMP information 20A, 20B, and 20C in FIG. 19 is the same as the corresponding information in FIG. 8, the description thereof will not be repeated.

The topology calculation unit 720 generates topology information 30 in FIG. 20 from the SNMP information 603 in FIG. 19. Since processing of calculating the topology information 30 in FIG. 20 is similar to the processing in FIG. 10, the description thereof will not be repeated.

(L3. Selection of Candidates and Decision of Grand Master)

Figure 21:
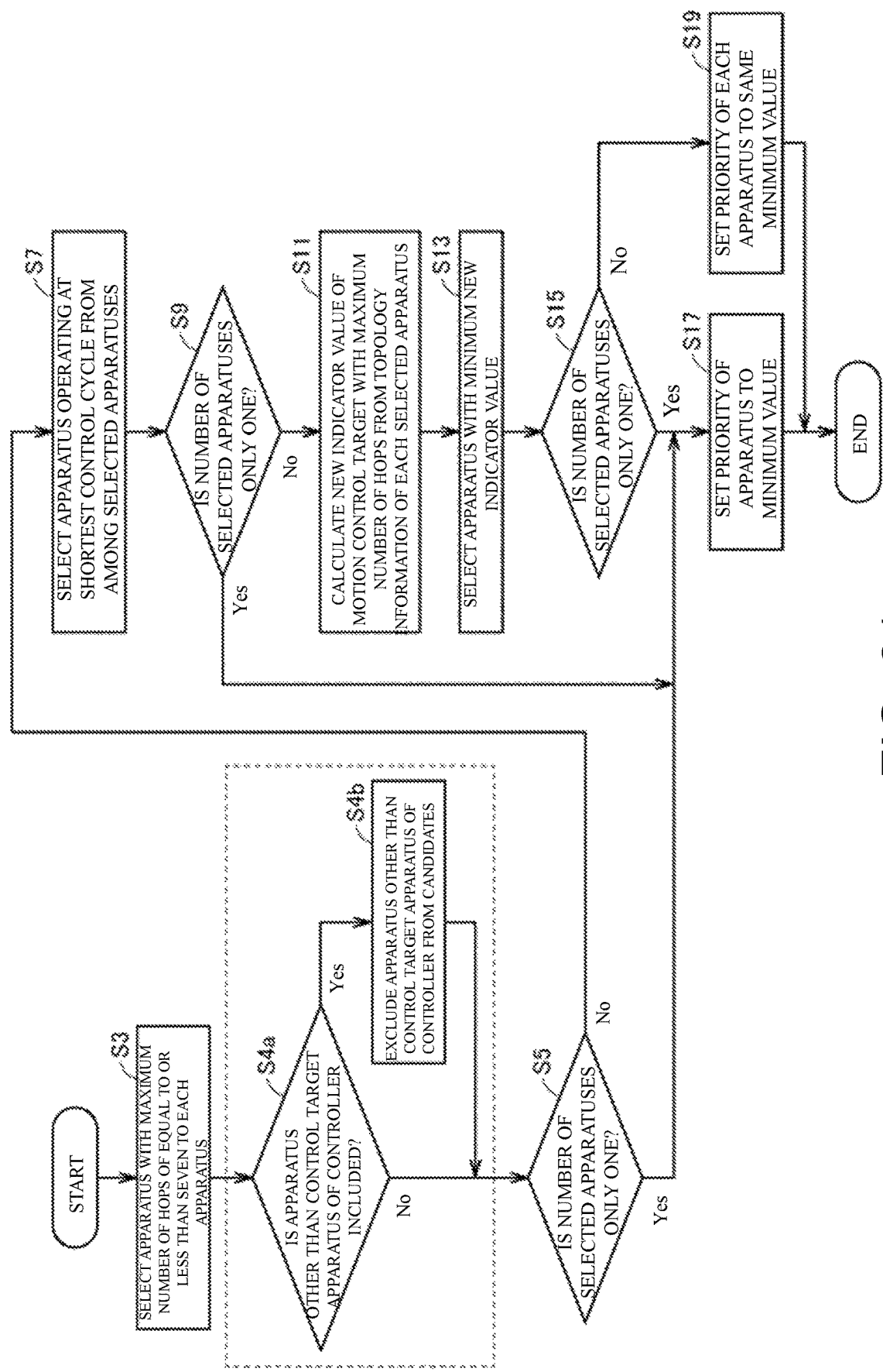
FIG. 21 is a flowchart illustrating another example of processing for selecting candidates of a grand master and deciding the grand master according to the present embodiment.

FIG. 21 is a flowchart illustrating another example of processing of selecting candidates of a grand master and deciding the grand master according to the present embodiment. The processing in FIG. 21 can be applied to a network configuration including daisy chain topology (FIG. 17). The processing in FIG. 21 is obtained by adding Steps S4a and S4b to the processing in FIG. 15, and the other processing in FIG. 21 is similar to that in FIG. 15. Therefore, the processing in Steps S4a and S4b will be mainly described as the processing in FIG. 21.

In the daisy chain topology, a path from an end point 200J (an end point as a remote control target) to a controller (switch 100G) that executes the motion control program includes apparatuses of control targets that are not controlled by the controller (that is, control targets controlled by the controllers 100H and 100I) as illustrated in the daisy chain topology 11C in FIG. 17, for example. In this manner, the controller 100H or the controller 100I is not a controller that executes the motion control program of the motion control targets 620, and it is thus necessary to exclude these from the candidate apparatuses of the grand master. Considering this point, such exclusion processing is performed in the processing in Steps S4a and S4b in FIG. 21.

In a case in which the switch (D) in FIG. 18 is excluded in such exclusion processing, the timer decision unit 711 excludes (deletes) the topology information 30D of the switch (D) from the topology information 30 in FIG. 20. It is thus possible to select, as grand masters, the timers 101 of the one or more controllers having the switching function for controlling the motion control targets 620 with priority from among the switches 100 selected on the basis of the path indicators.

(L4. Ring-Type Topology)

Figure 22:
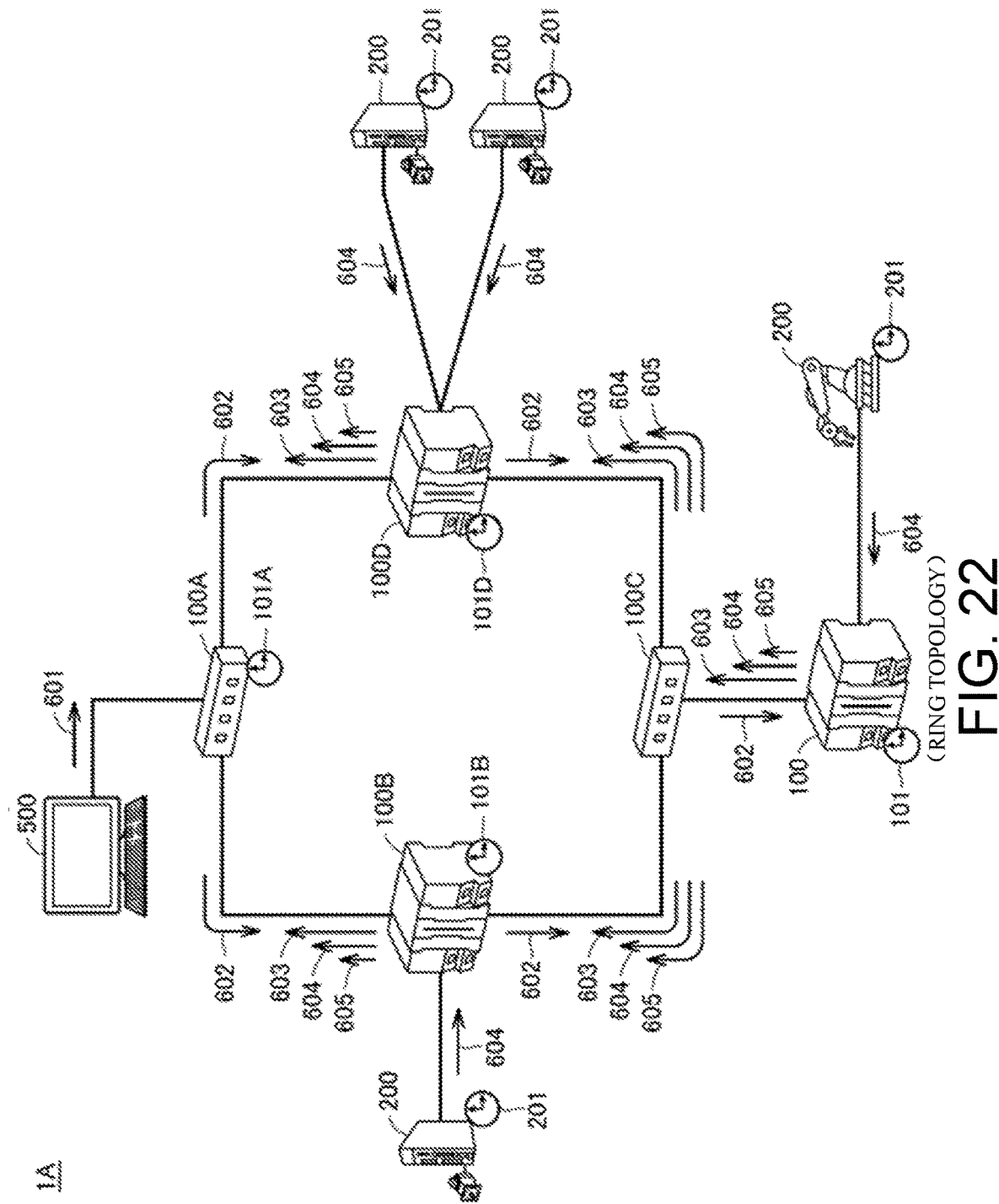
FIG. 22 is a diagram schematically illustrating another configuration of the control system according to the present embodiment.

FIG. 22 is a diagram schematically illustrating another configuration of the control system according to the present embodiment. Referring to FIG. 22, the control system 12 includes a ring-type network configuration. In the ring-type network configuration, the switches 100A, 100B, 100C, and 100D are connected into a circular shape via the network 2, and data is transferred in one direction in the ring. Moreover, only an end point 200 is connected to the switch 100B, a plurality of end points 200 is connected to the multiple ports of the switch 100D, and an end point 200 is connected to the switch 100C via another switch 100.

In FIG. 22, it is possible to similarly apply the aforementioned method of deciding a grand master to the ring-type topology by the support apparatus 500 connected to the switch 100A activating the support tool 770.

M. Dynamic Decision of Grand Master

The decision of a grand master based on the aforementioned network topology is performed by the support apparatus 500 activating the support tool 770 (this will also be referred to as stationary decision). In the present embodiment, dynamic decision of a grand master is also provided. In the dynamic decision, any of switches 100 constituting the network, typically a controller instead of the support apparatus 500 performs the support tool 770. Such a controller will also be referred to as a "selector" below. Therefore, the selector can perform processing that is similar to that of the support tool 770 and decide a grand master even in an environment in which it is difficult to connect the support apparatus 500 to the control system.

Figure 23:
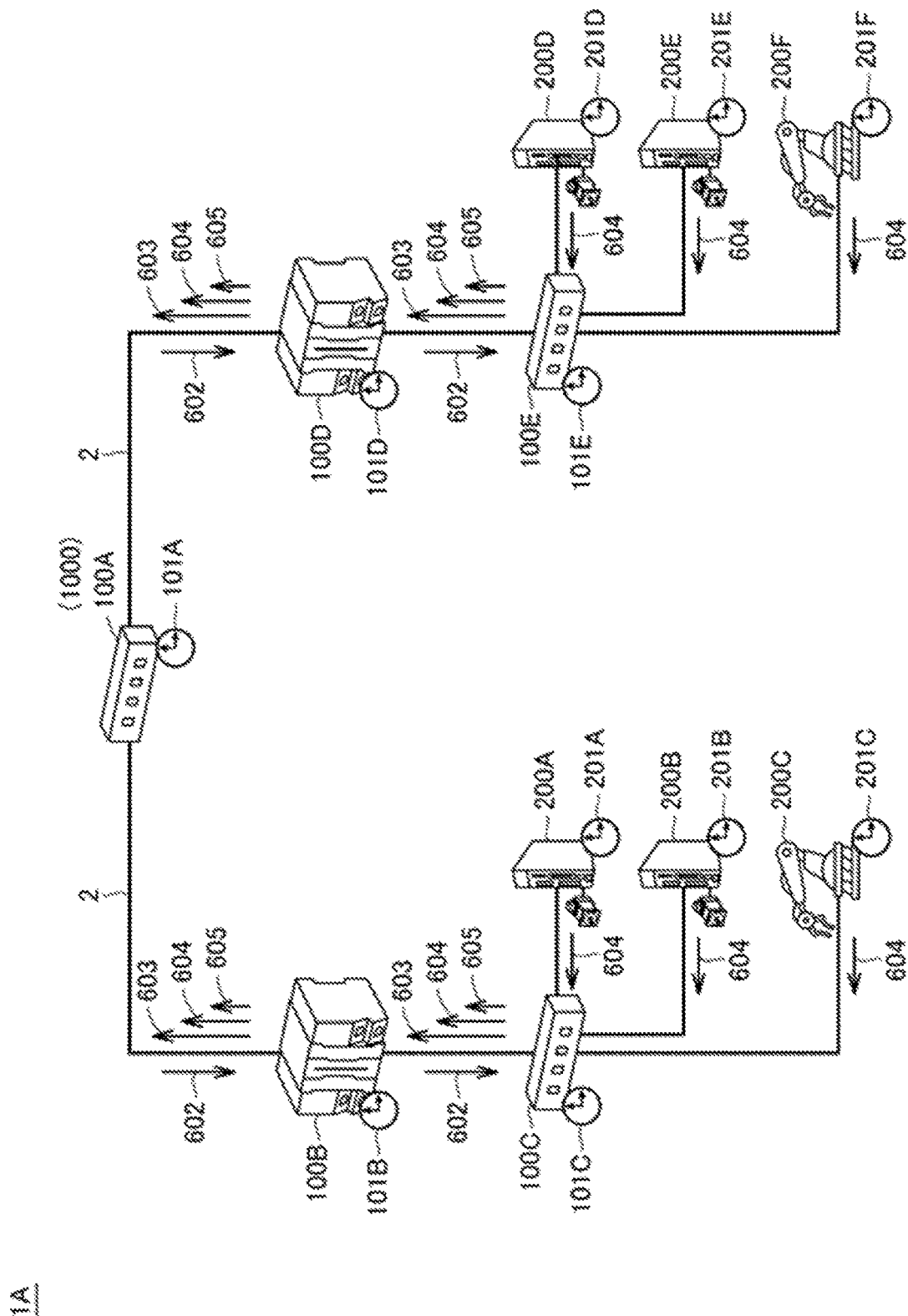
FIG. 23 is a diagram schematically illustrating an example of a configuration of the control system for dynamically deciding the grand master according to the present embodiment.

FIG. 23 is a diagram schematically illustrating an example of a configuration of a control system 1A for dynamic decision of a grand master according to the present embodiment. Although the control system for dynamic decision in FIG. 23 does not include the support apparatus 500, the other configurations are similar to the configurations illustrated in FIG. 1, and description thereof will thus not be repeated.

(M1. Configuration of Control System for Dynamic Decision of Grand Master)

Figure 24:
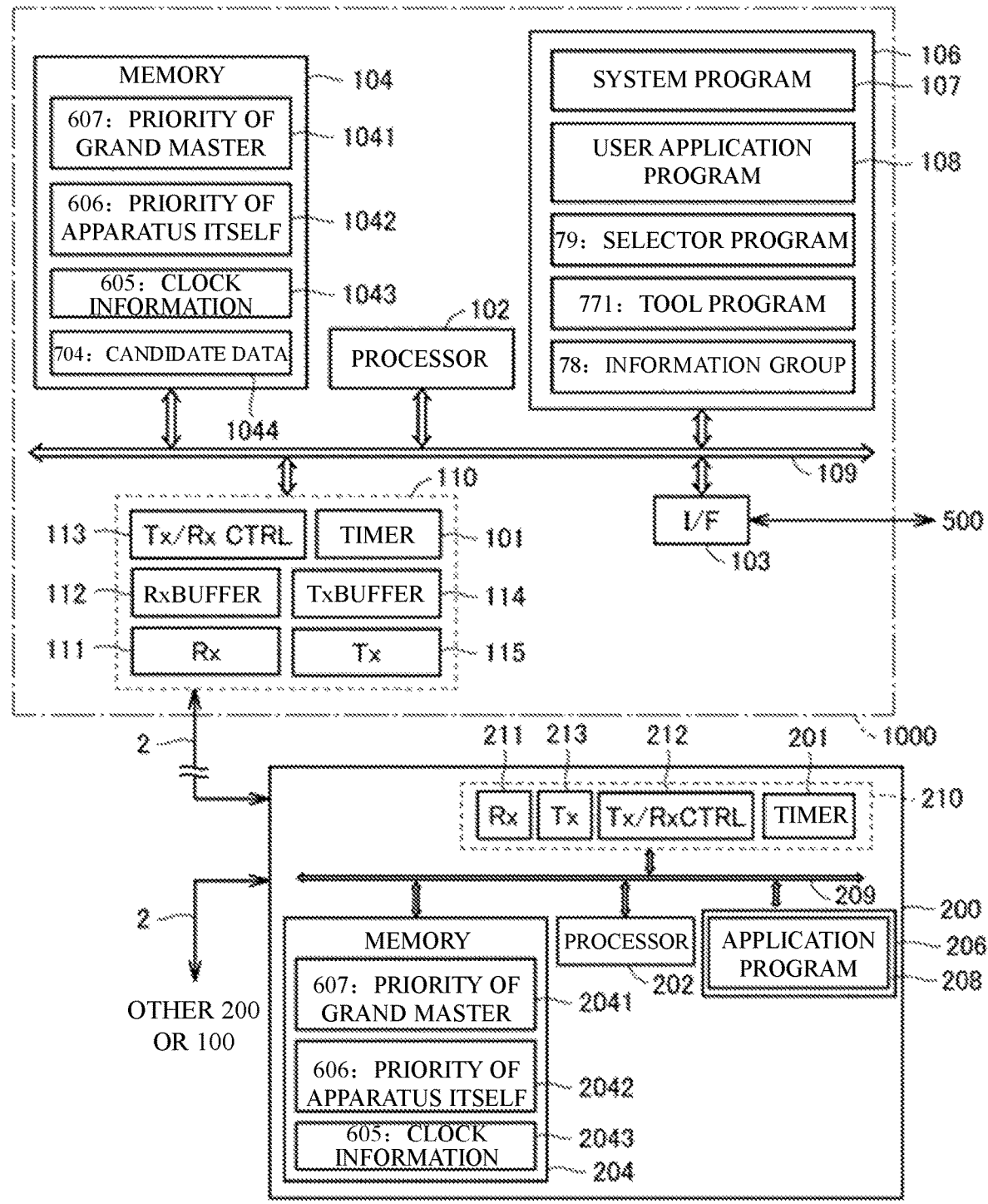
FIG. 24 is a diagram schematically illustrating an example of a hardware configuration of the control system according to the present embodiment.

FIG. 24 is a diagram schematically illustrating an example of a hardware configuration of the control system according to the present embodiment. In FIG. 24, an end point 200 is illustrated in an associated manner with a switch 1000 of the control system 1A in FIG. 23. The switch 1000 in FIG. 24 is typically constituted by PLC as a base, the switch 1000 is not limited to the configuration as long as the configuration includes the aforementioned switching function.

The switch 1000 includes, in the memory 104, a region 1044 that stores candidate data 704 indicating whether the apparatus itself is a selector candidate. Also, a selector program 79, a tool program 771, and an information group 78 related to the dynamic decision of a grand master are stored in the storage 106 in addition to the system program 107 and the user application program 108 in FIG. 2. The tool program 771 and the information group 78 in the storage 106 are similar to the tool program 771 and the information group 78 (FIG. 4) stored in the HDD 505 of the support apparatus 500, and the description thereof will thus not be repeated. Also, the other configurations of the switch 1000 and the configuration of the end point 200 are similar to those illustrated in FIG. 4, and the description thereof will thus not be repeated.

Figure 25:
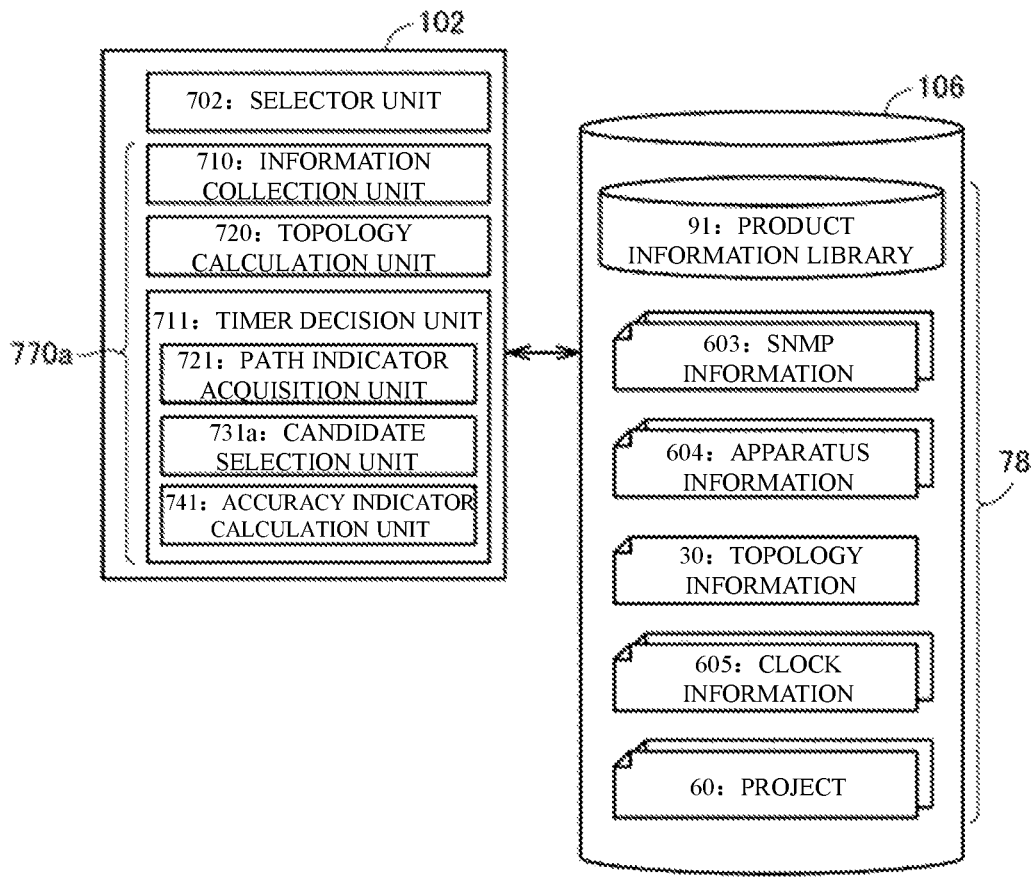
FIG. 25 is a diagram schematically illustrating a software configuration of a switch 1000 according to the present embodiment.

FIG. 25 is a diagram schematically illustrating a software configuration of the switch 1000 according to the present embodiment. FIG. 25 illustrates functions of a selector unit 702 and a support tool 770a provided by the CPU 102 executing a tool program 771 and a selector program 79 under the system program 107. The functions of the support tool 770a are similar to the functions illustrated in FIG. 5 other than the function of a candidate selection unit 731a corresponding to a candidate selection program 75a, the description thereof will thus not be repeated.

(M2. Overall Processing Flow)

An overview of processing related to dynamic decision of a grand master will be described with reference to FIGS. 26 and 27. In a case in which dynamic decision of a grand master is performed, it is assumed that although the apparatuses connected to the network 2 are in a power ON state, operations related to control are stopped, that is, data (a field value, control data, and the like) related to control is not transferred through the network 2.

Figure 26:
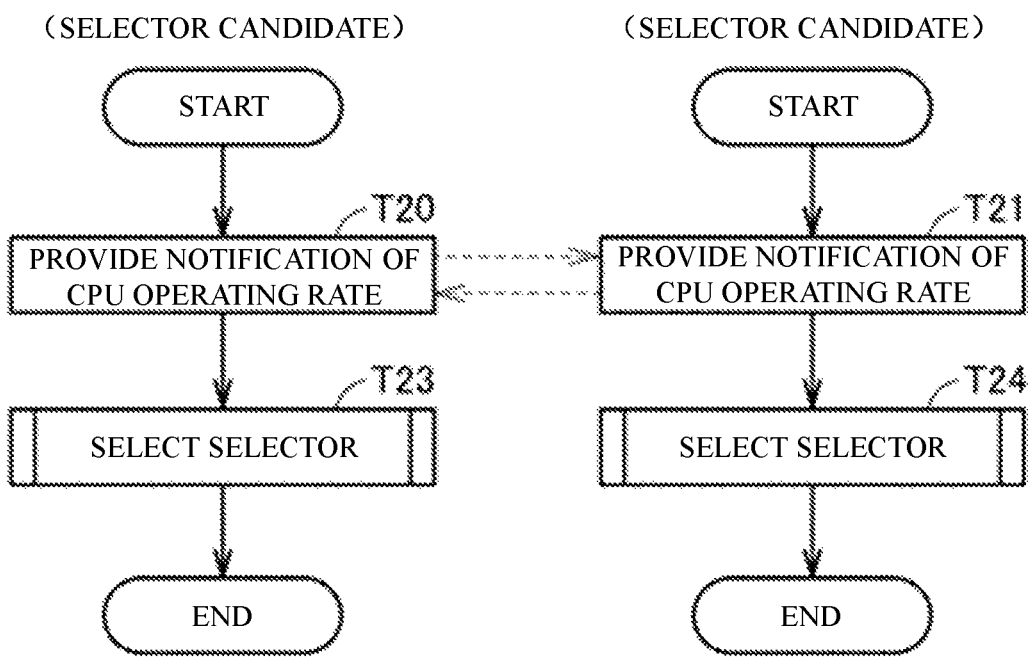
FIG. 26 is a flowchart illustrating an example of processing for deciding a selector according to the present embodiment.

FIG. 26 is a flowchart illustrating an example of processing of deciding a selector according to the present embodiment. In FIG. 26, the switch 1000 connected to the network 2 corresponds to a selector candidate. The selector unit 702 of each switch 1000 (selector candidate) communicates with other switches 1000 connected to the network 2 and decides a selector.

Specifically, the selector units 702 of the switches 1000 communicate notifications including operating rates of CPUs that the processors 102 of the apparatuses themselves have with each other (Steps T20 and T21). The selector unit 702 of each switch 1000 compares the CPU operating rates indicated by the notifications received from the other switches 1000 and selectively decides a "selector" on the basis of a result of the comparison (Steps T23 and T24). Processing in Steps T24 and T25 will be described later in FIG. 28.

Figure 27:
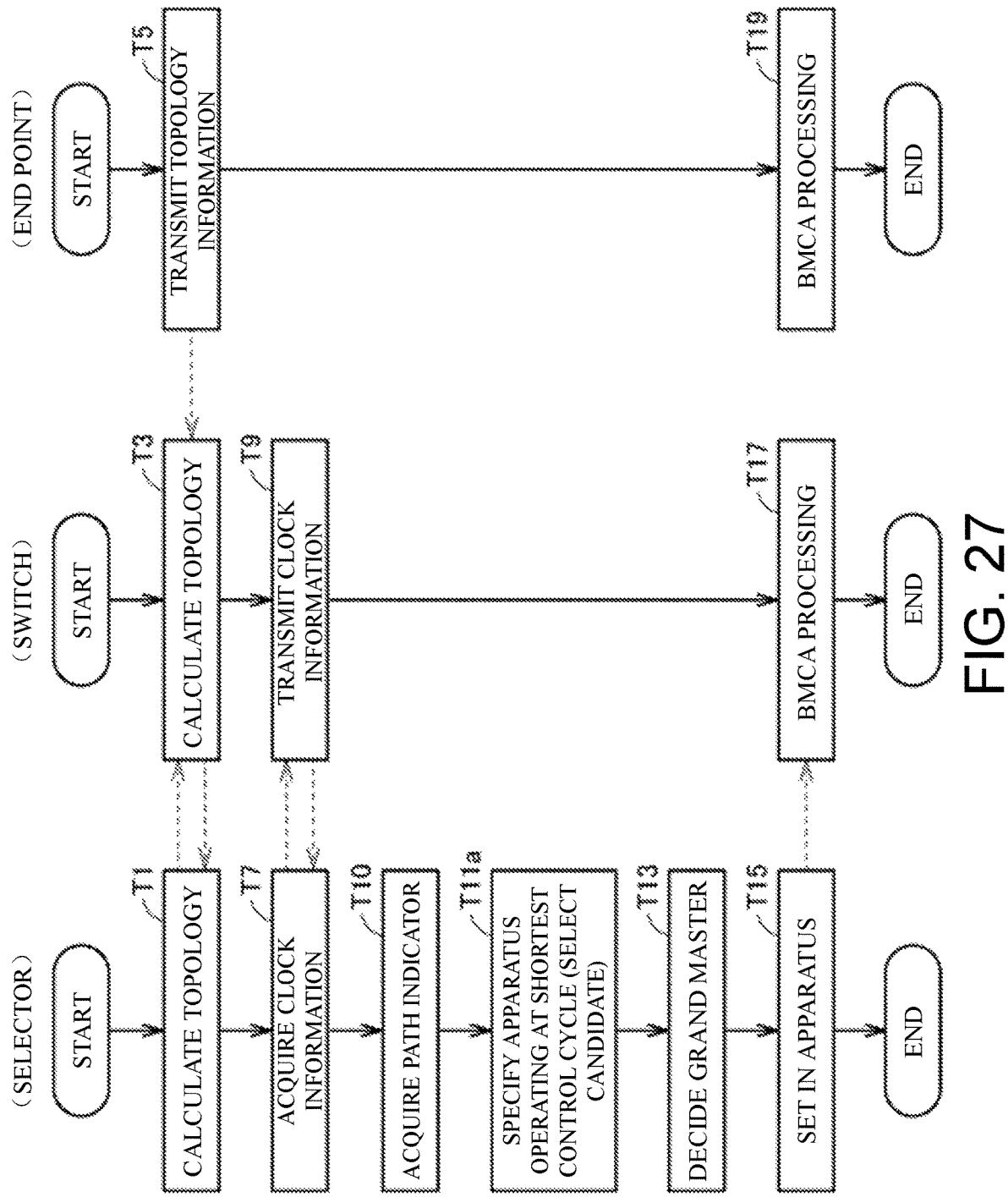
FIG. 27 is a flowchart illustrating an example of processing for deciding a grand master using the selector according to the present embodiment.

FIG. 27 is a flowchart illustrating an example of processing of deciding a grand master using a selector according to the present embodiment. The flowchart in FIG. 27 is performed by the support tool 770a being activated by the "selector" selected in the processing in FIG. 26. The processing of the selector in FIG. 27 is similar to the processing in FIG. 6 except for processing (FIG. 30) in Step T11a, and the description thereof will thus not be repeated. Also, the processing of the switch 1000 (non-selector) and the processing of the end point 200 are similar to the processing illustrated in FIG. 6, the description thereof will thus not be repeated.

(M3. Processing of Selectively Deciding Selector)

Figure 28:
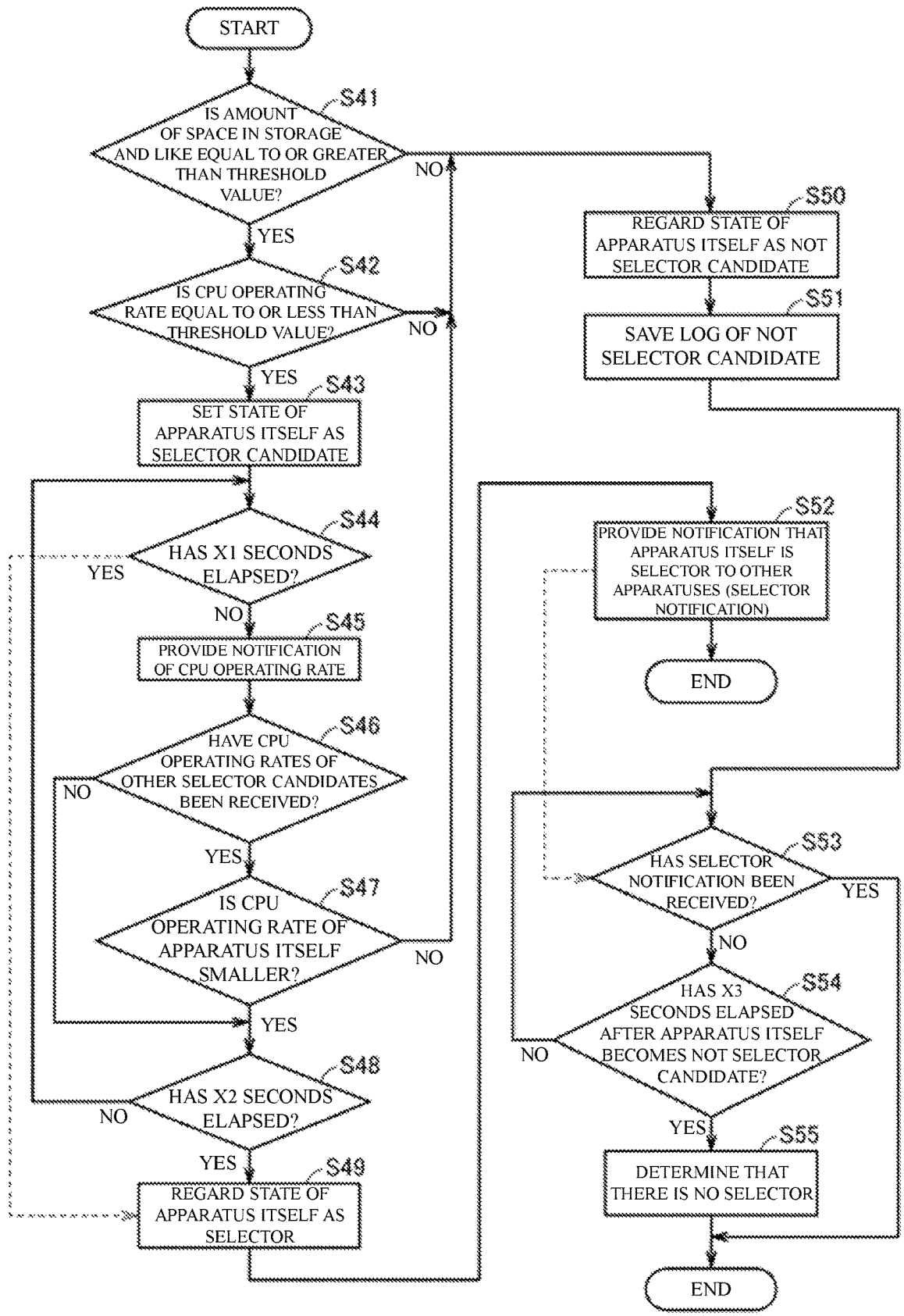
FIG. 28 is a flowchart illustrating an example of processing for selectively deciding the selector according to the present embodiment.

FIG. 28 is a flowchart illustrating an example of processing of selectively deciding a selector according to the present embodiment.

First, the selector unit 702 determines whether or not the apparatus itself is suitable as a selector candidate (Steps S41 and S42), and when it is determined that the apparatus itself is not suitable (NO in Step S41 or NO in Step S42), the selector unit 702 sets (stores) candidate data 704 of "not selector candidate" indicating that the apparatus itself is not a selector candidate in the region 1044 (Step S50), and thus saves a log of "not selector candidate" (Step S51). Thereafter, the processing proceeds to Step S53, which will be described later.

The determination of whether or not the apparatus itself is suitable as a selector candidate is made on the basis of whether or not there is an enough margin in resources of the apparatus itself to execute the program of the support tool 770. For example, whether or not the amount of space in the storage region including the storage 106 or the memory 104 in the apparatus itself is equal to or greater than a threshold value (Step S41) is determined, or whether or not the CPU operating rate of the apparatus itself is equal to or less than a threshold value is determined (Step S42).

If it is determined that the amount of space in the storage region in the apparatus itself is equal to or greater than the threshold value (YES in Step S41), and it is determined that the CPU operating rate of the apparatus itself is equal to or less than the threshold value (YES in Step S42), the selector unit 702 sets (stores) the candidate data 704 of "selector candidate" indicating that the apparatus itself is a selector candidate in the region 1044 (Step S43). Thereafter, the selector unit 702 determines whether or not a predetermined period of time (X1 hours, for example) has elapsed after start of the processing in order to determine whether or not a period for selectively deciding a selector has been achieved (Step S44).

If it is determined that the predetermined time has elapsed (YES in Step S44), the selector unit 702 sets (stores) the candidate data 704 indicating "selector" in the region 1044 (Step S49) and transmits a selector notification indicating that the apparatus itself is a "selector" on the basis of the candidate data 704 to other apparatuses (Step S52). Thereafter, the processing proceeds to Step S53, which will be described later.

On the other hand, if it is determined that the predetermined time has not elapsed after the start of the processing (NO in Step S44), the selector unit 702 transmits a notification including the CPU operating rate of the apparatus itself to other apparatuses through multicast (Step S45). The selector unit 702 determines whether or not notifications including CPU operating rates are to be received from the other selector candidates (Step S46), and if it is determined that the notification has been received (YES in Step S46), the selector unit 702 compares the CPU operating rates included in the received notifications with the CPU operating rate of the apparatus itself and determines whether or not the CPU operating rate of the apparatus itself is smaller than the CPU operating rates of the other selector candidates on the basis of a result of the comparison (Step S47). If the selector unit 702 determines that the CPU operating rate of the apparatus itself is equal to or greater than the CPU operating rates of the other selector candidates on the basis of the result of the comparison (NO in Step S47), the selector unit 702 moves on to Step S50.

Also, if the selector unit 702 determines that the notifications including the CPU operating rates have not been received from the other selector candidates (NO in Step S46) or if the selector unit 702 determines that the CPU operating rate of the apparatus itself is less than the CPU operating rates of the other selector candidates (YES in Step S47), the selector unit 702 determines whether or not a predetermined period of time, that is, a transmission cycle time of the CPU operating rate×2 has elapsed after the notification in Step S45 is transmitted (Step S48). The processing proceeds to Step S49 if it is determined that the predetermined period of time has elapsed (YES in Step S48), or the processing returns to Step S44, and the notification of the CPU operating rate is transmitted if it is determined that the predetermined period of time has not elapsed (NO in Step S48).

In Step S53, the selector unit 702 determines whether or not the selector notifications have been received from the other selector candidates (Step S53), and the selector unit 702 ends the processing if it is determined that the selector notifications have been received (YES in Step S53).

On the other hand, if the selector unit 702 determines that the selector notifications have not been received from the other selector candidates (NO in Step S53) and determines that the predetermined period of time (X3 seconds, for example) has elapsed (YES in Step S54) after the candidate data 704 of "not selector candidate" is set in the region 1044 (Step S50), the selector unit 702 determines that there are no selectors in the control system (Step S55).

If the selector unit 702 determines that the predetermined period of time has not elapsed (NO in Step S54) after the candidate data 704 of "not selector candidate" is set in 1044 (Step S50), the processing returns to Step S53.

According to the processing in FIG. 28, "selector" is set in the candidate data 704 of the selector candidates having enough margins in resources to execute the support tool 770*a* from among the plurality of selector candidates. In a case in which "not selector candidate" is set in the candidate data 704 of all the selector candidates when the processing in FIG. 28 ends, the clock time synchronization processing may be performed in accordance with IEEE 802.1AS in the related art.

(M4. Example of Topology Considering Control Targets)

Figure 29:
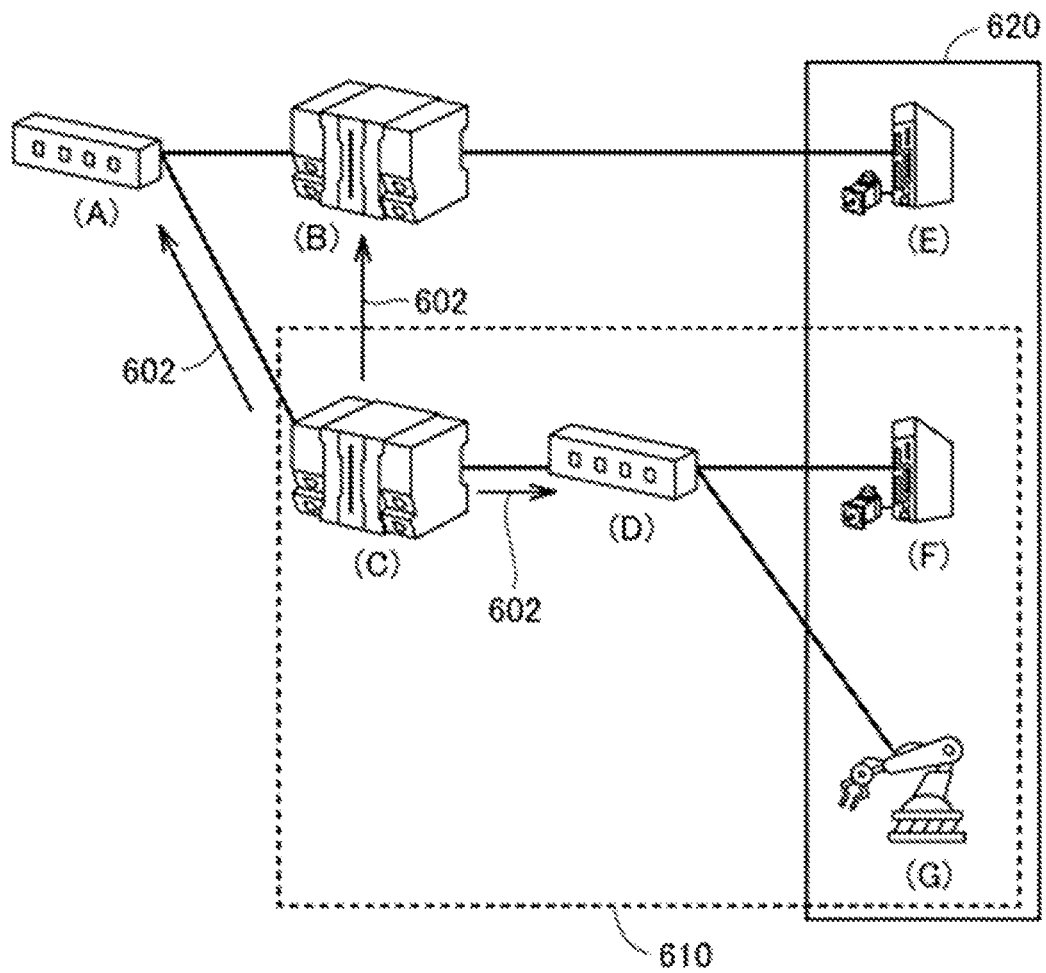
FIG. 29 is a diagram schematically illustrating another example of topology considering control targets according to the present embodiment.

FIG. 29 is a diagram schematically illustrating another example of topology considering control targets according to the present embodiment. As the topology in FIG. 29, topology mainly including end points 200 (indicated as end points (E), (F), and (G) in the drawing) as the motion control targets 620 is illustrated. The topology includes switches 100 (indicated as switches (A), (B), (C), and (D) in the drawing) connected to the end points (E), (F), and (G). Moreover, in the topology in FIG. 29, the switches (B) and (C) correspond to controllers that execute the motion control program of the motion control targets 620, and among these, the switch (C) executes the motion control program at the shortest cycle.

According to the topology in FIG. 29, the switch (C) is decided as a "selector" in the processing in FIG. 28, and the information request 602 is transmitted to the other switches by the switch (C) as a selector performing the support tool 770. In FIG. 29, the priority setting information 601 transmitted from the switch (C) as the selector and the SNMP information 603, the apparatus information 604, and the clock information 605 transmitted from the other switches are similar to the information illustrated in FIG. 1, and illustration thereof is omitted.

(M5. Decision of Related Apparatus of Shortest Cycle Control)

Figure 30:
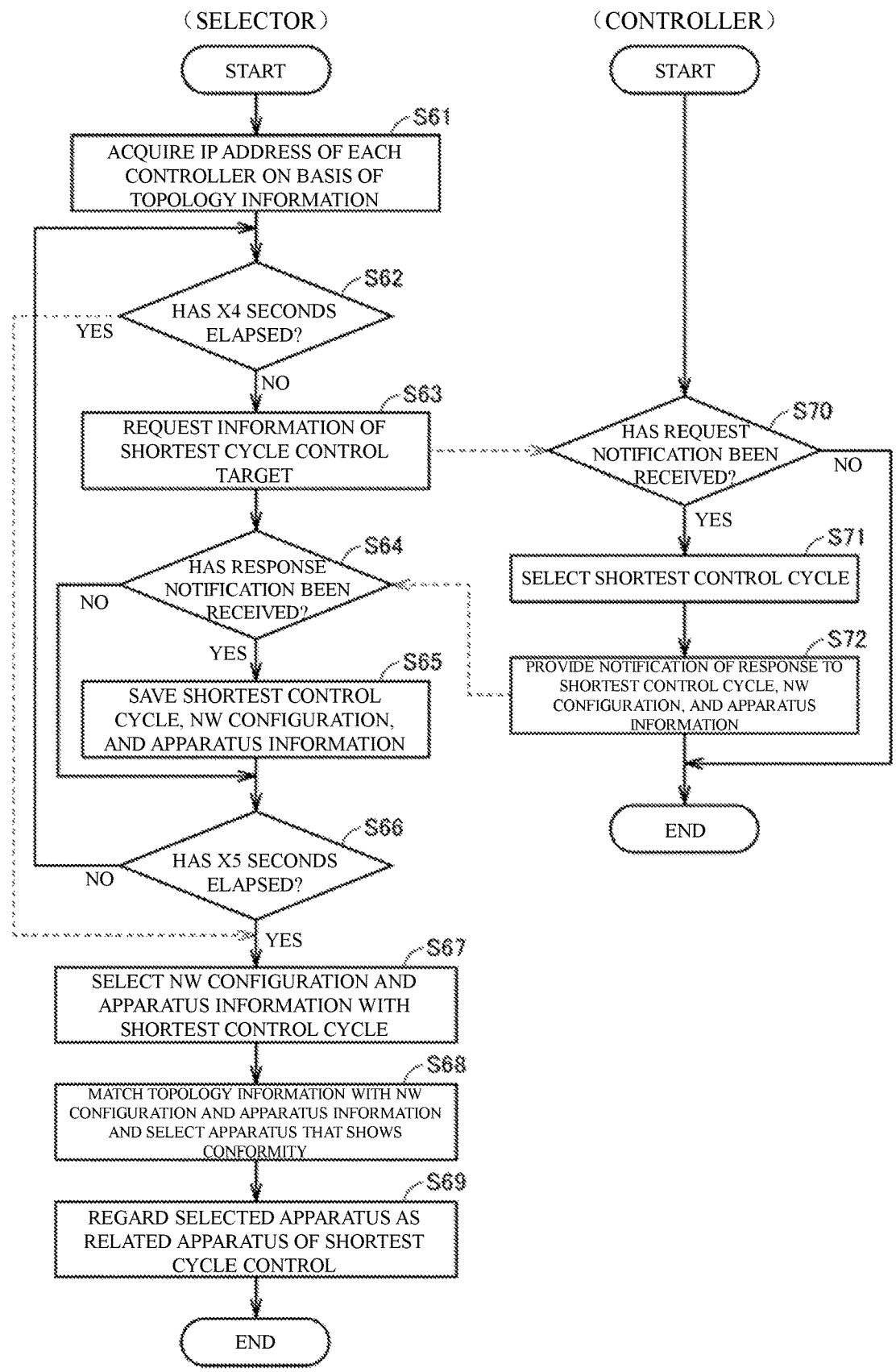
FIG. 30 is a flowchart illustrating an example of processing for deciding a related apparatus of shortest cycle control according to the present embodiment.

FIG. 30 is a flowchart illustrating an example of processing of deciding a related apparatus of the shortest cycle control according to the present embodiment. The switches 1000 decided as "selectors" in the processing in FIG. 28 decide the related apparatus 610 of the shortest cycle control through communication with the other controllers. Here, each controller stores the project 60 (FIG. 14) of the apparatus itself in the internal memory.

Referring to FIG. 30, the candidate selection unit 731*a* of each selector acquires an IP address of each controller connected to the network 2 on the basis of the topology information 30 (Step S61).

The candidate selection unit 731*a* requests information regarding the shortest control cycle from each controller as will be described later (Step S63). Considering this, a request transmission cycle (X5 seconds, for example) and a period (elapse of a predetermined period of time (elapse of X4 seconds, for example) from the request) of a response to the request are provided in the processing in FIG. 30.

The candidate selection unit 731*a* determines whether or not the predetermined period of time has elapsed (X4 seconds has elapsed, for example) after the transmission of the aforementioned request (Step S62). If it is determined that the predetermined period of time has elapsed (YES in Step S62), the candidate selection unit 731*a* moves on to Step S67, which will be described later.

If it is determined that the predetermined period of time has not elapsed after the request is transmitted (NO in Step S62), the candidate selection unit 731*a* transmits a request notification including a request for information regarding the shortest control cycle target to the controller using the IP address acquired in Step S61 (Step S63).

The processor 102 of the controller determines whether or not the request notification has been received from the candidate selection unit 731*a* of the selector (Step S70), and ends the processing if it is determined that the request notification has not been received (NO in Step S70), or selects (extracts) the shortest control cycle 63 from the project 60 that the apparatus itself has (Step S71) if it is determined that the request notification has been received (YES in Step S70). The processor 102 of the controller searches for the shortest control cycle 63, the NW configuration 61, and the apparatus information 62 from the project 60 and transmits a notification of a response including the searched information to the selector (Step S72).

The candidate selection unit 731*a* of the selector determines whether or not the response notification in response to the aforementioned request notification has been received from the controller (Step S64). The processing proceeds to Step S66 if it is determined that the response has not been received (NO in Step S64), or the candidate selection unit 731*a* saves (stores) content of the received response (the shortest control cycle, the NW configuration, and the apparatus information) in the memory 104 (Step S65) if it is determined that the response has been received (YES in Step S64). The candidate selection unit 731*a* moves on to Step S67 if it is determined that the time of the transmission cycle (X5 seconds, for example) of the request has elapsed (YES in Step S66), or the candidate selection unit 731*a* returns to Step S62 if it is determined that the time has not elapsed (NO in Step S66).

In Step S67, the candidate selection unit 731a selects the NW configuration 61 and the apparatus information 62 of the shortest control cycle 63 that is the shortest, out of the information stored in Step S65 (Step S67). In this case, if a plurality of shortest control cycles 63 that are the shortest is selected, all the NW configurations 61 of the plurality of shortest control cycles 63 are selected.

The candidate selection unit 731a matches the topology information 30 with the NW configuration 61 and the apparatus information 62 of the selected project 60, and selects, from the topology information 30, information of an apparatus that conforms to the NW configuration 61 and the apparatus information 62 on the basis of a result of the matching (Step S68). Specifically, the apparatuses (the switches 100, the end points 200) having the apparatus names 22 and 24 and the apparatus data 21 and 24 (IP addresses) that conform to the NW configuration 61 and the apparatus information 62 are decided as related apparatuses 610 of the shortest cycle control on the basis of the result of the matching (Step S69). In this manner, the selector can decide the switches (C) and (D) and the end points (F) and (G) in FIG. 29 as the related apparatuses 610 of the shortest cycle control, for example.

<M6. Other Examples of Network Configuration>

Figure 31:
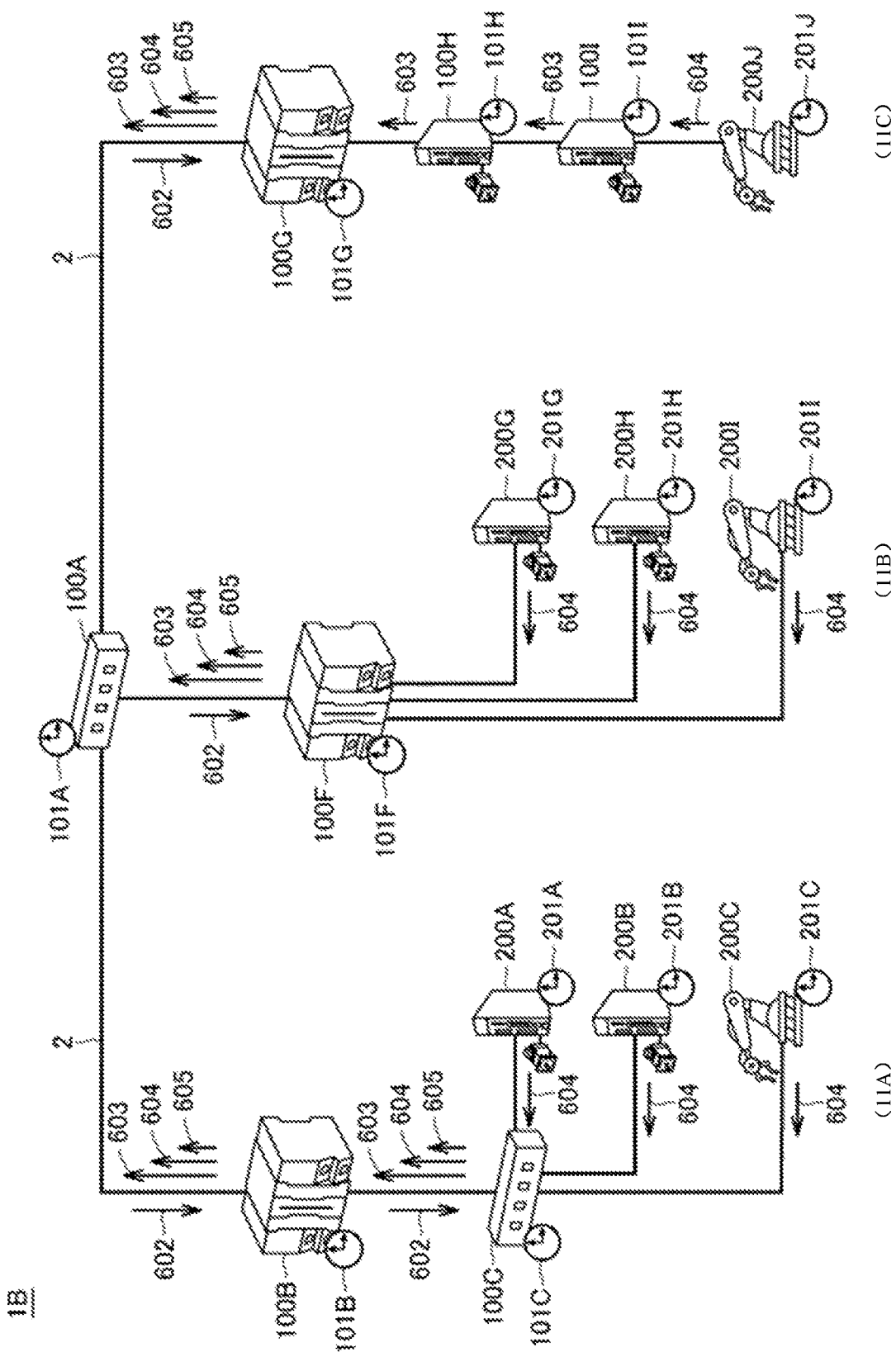
FIG. 31 is a diagram schematically illustrating another example of a network configuration according to the present embodiment.

FIG. 31 is a diagram schematically illustrating another example of the network configuration according to the present embodiment. The network configuration including the daisy chain topology 11C of the control system 1B in FIG. 31 is a configuration in which a grand master is dynamically decided and is similar to a configuration obtained by excluding the support apparatus 500 from the network configuration in FIG. 17, and the description thereof will thus not be repeated.

Figure 32:
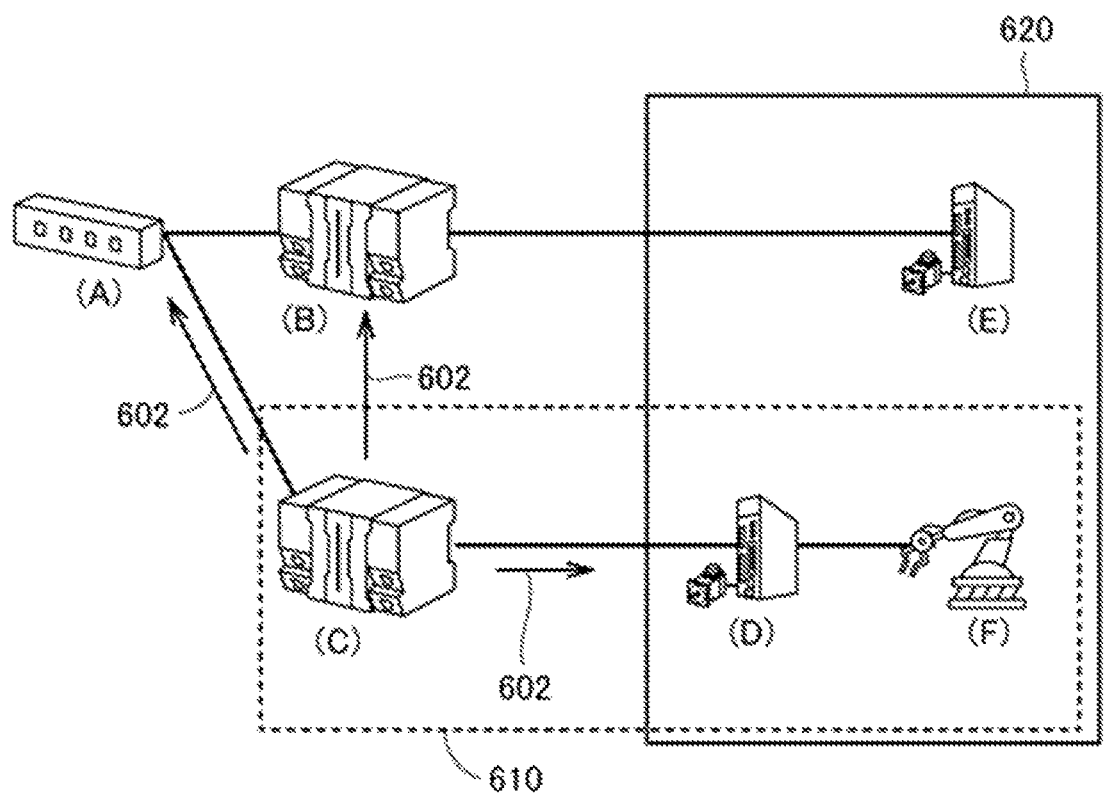
FIG. 32 is a diagram schematically illustrating another example of topology considering control targets according to the present embodiment.

FIG. 32 is a diagram schematically illustrating another example of topology considering control targets according to the present embodiment. As the topology in FIG. 32, topology mainly including control targets of a type requiring clock time synchronization with high accuracy, that is, apparatuses (indicated as end points (E) and (F) and a switch (D) in the drawing) to which the motion control targets 620 are connected, as control targets is illustrated. Moreover, according to the topology in FIG. 32, switches (A), (B), and (C) correspond to controls capable of executing the motion control program of the motion control targets 620, and among these, the switches (C) and (D) execute the motion control program at the shortest control cycle. Therefore, in FIG. 32, the related apparatuses 610 of the shortest cycle control includes the switches (C) and (D) and the end point (F), and one or a plurality of timers 101 that the related apparatuses 610 of the shortest cycle control have can be selected as candidate timers.

FIG. 33 is a diagram schematically illustrating another example of the topology information 30 according to the present embodiment. In FIG. 33, the topology information 30D corresponding to the switch (D) is deleted (excluded) from the topology information 30 in FIG. 33 by the switch (D) being excluded through the aforementioned exclusion processing.

(M7. Ring-Type Topology)

Figure 34:
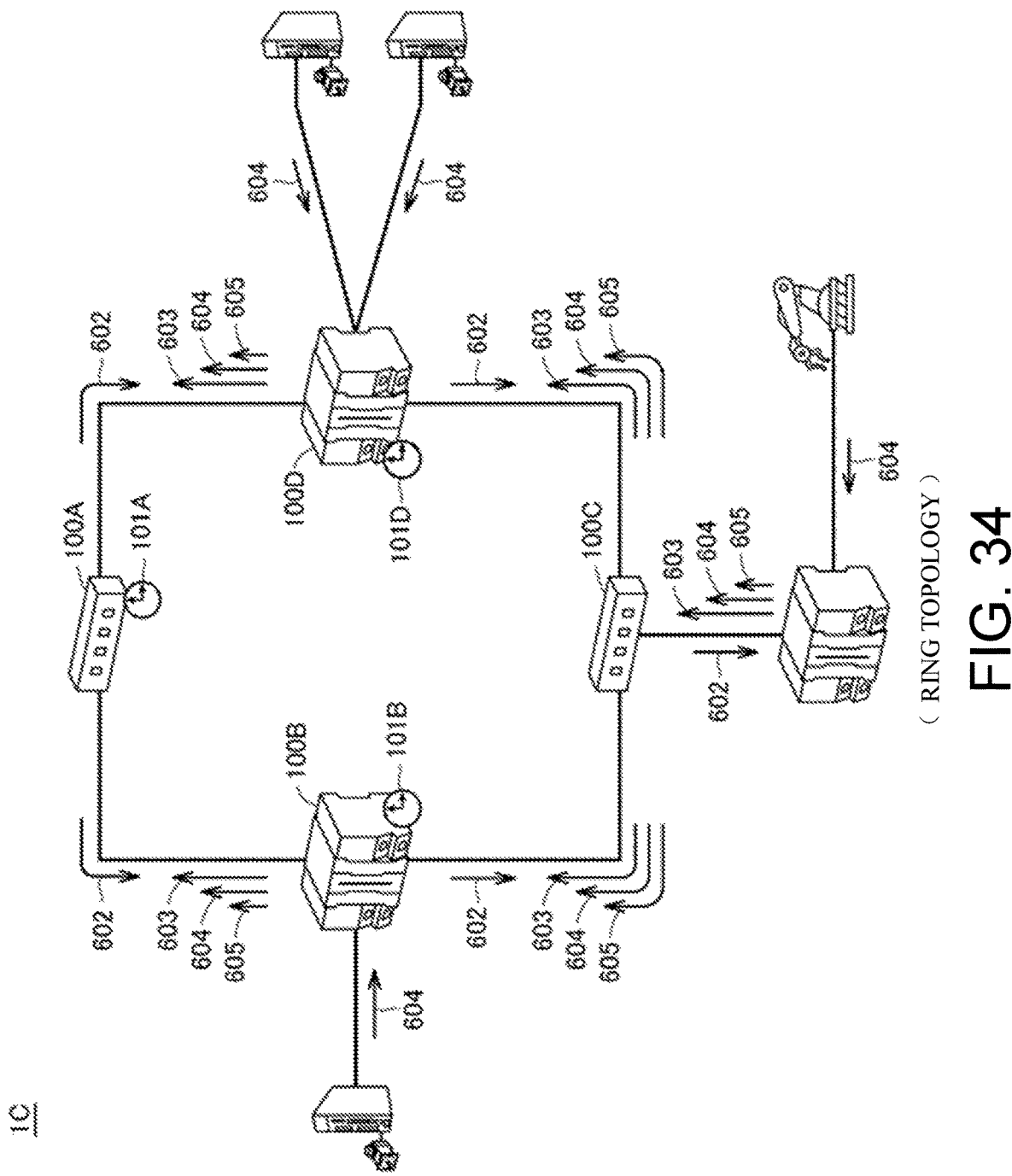
FIG. 34 is a diagram schematically illustrating another configuration of the control system according to the present embodiment.

FIG. 34 is a diagram schematically illustrating another configuration of a control system according to the present embodiment. Referring to FIG. 34, a control system 1C includes a ring-type network configuration. In the ring-type network configuration, the switches 100A, 100B, 100C, and 100D are connected into a circular shape via the network 2, and in a case in which the grand master is dynamically decided, any of these switches is selected as a selector, the support tool 770a is thereby performed by the switch of the selector, and the dynamic decision of a grand master is realized. Although the network configuration of the control system 1C in FIG. 34 does not include the support apparatus 500, the other configurations are similar to the configurations illustrated in FIG. 22, and the description thereof will thus not be repeated.

N. System Synchronization Processing

If the timer decision unit 711 decides the timer 101 as a grand master, then system synchronization processing is performed to cause the timer included in each apparatus connected to the network 2 to be clock time-synchronized with the grand master.

Specifically, the switch 100 including the timer 101 set as the grand master performs processing of adjusting the timers 101 of the other switches 100 and the timers 201 of the end points 200 with reference to the timer 101 in order to achieve clock time synchronization with the other switches 100 and the end points 200.

O. Program

The CPU 502 of the support apparatus 500 or the processor 102 of the switch 100 controls each component in the support apparatus 500 or the switch 100 by executing the program of the support tool 770 (770a). The HDD 105 or the storage 106 can store the program, the data, and the like related to such a support tool.

The storage media of the HDD 505 and the storage 106 are not limited to an HDD or an SSD.

Also, the program or the data related to the support tool 770 may be downloaded in the HDD 505 via various communication lines. Alternatively, the program or the data may be downloaded in the HDD 505 via a storage medium 501. The storage medium 501 is a medium that accumulates information such as the program and the like using an electrical, magnetic, optical, mechanical, or chemical actions such that a computer, another apparatus, a machine, or the like can read the recorded information such as the program. The support apparatus 500 may acquire the program or the data related to the support tool 770 from the storage medium 501. The program or the data related to the selector unit 702 and the support tool 770a may be downloaded in the storage 106 via various communication lines. Alternatively, the program or the data may be downloaded in the HDD 505 via the storage medium 501.

The program can be executed by one or more processors such as CPUs or a combination of a processor and a circuit such as an application specific integrated circuit (ASIC) or a field-programmable gate array (FPGA).

P. Advantages

Figure 35:
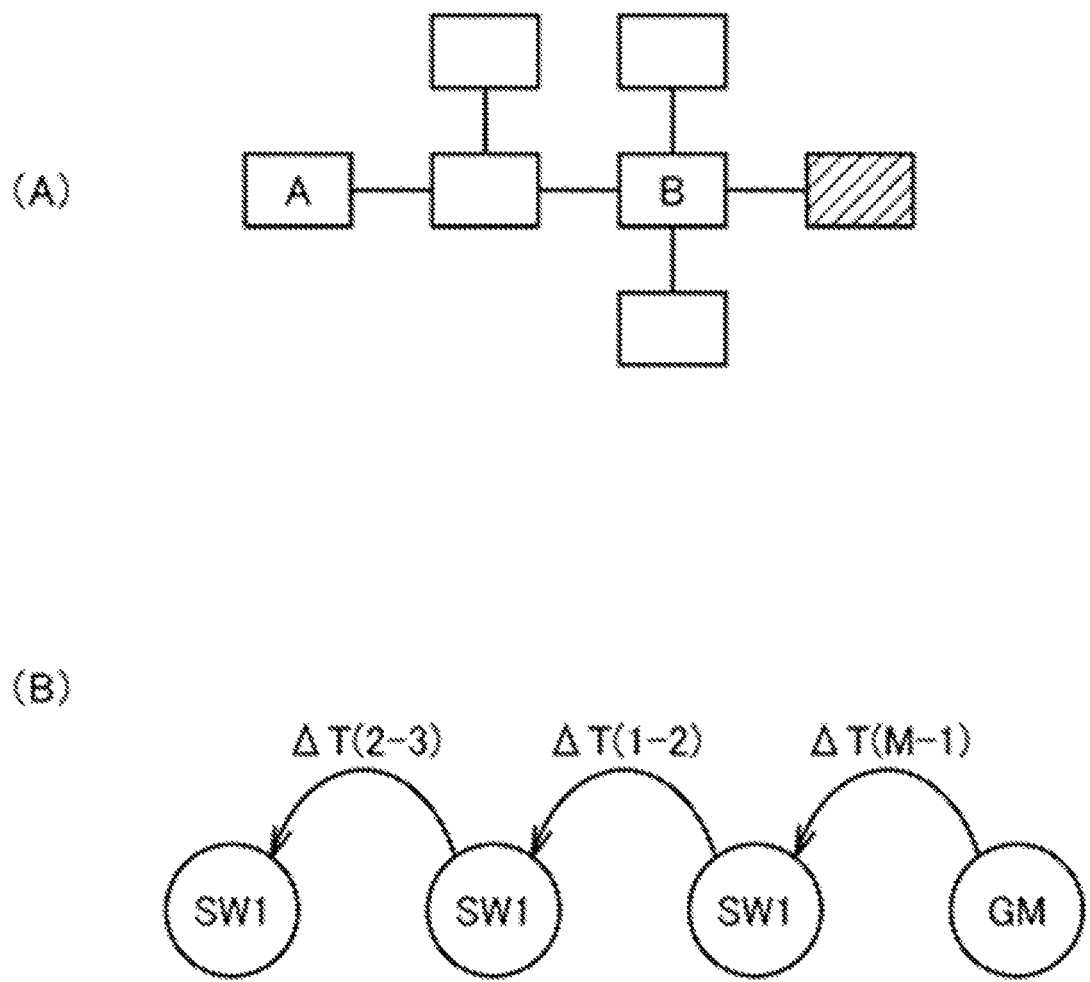
FIG. 35 is a diagram for explaining advantages achieved by decision of the grand master according to the present embodiment.

FIG. 35 is a diagram for explaining advantages provided by decision of a grand master according to the present embodiment. (A) of FIG. 35 illustrates topology in which a plurality of apparatuses (switches 100 or the end points 200) are represented by rectangular marks in the network configuration of the control system and these marks are connected via a network. In (A) of FIG. 35, the rectangles "A" and "B" correspond to apparatuses of the grand masters, and the hatched apparatuses are target apparatuses including timers that are clock time-synchronized with the grand master.

(B) in FIG. 35 schematically illustrates an example of the aforementioned system synchronization processing. In (B) of FIG. 35, clock time synchronization is performed between two apparatuses, namely the apparatus of the grand master GM and the apparatus SW1 that is adjacent thereto, and then the apparatus SW1 that has been clock time-synchronized becomes a master and clock time-synchronizes the timer of the adjacent apparatus SW2. Since clock time-synchronization is successively performed between adjacent apparatuses, errors (ΔT(M-1), ΔT(1-2), Δt(2-3)) are propagated. Therefore, the errors propagated increase as the number of hops increases, and accuracy of the clock time synchronization is degraded. As a background of the present embodiment, the number of cases in which clock accuracy is required in a millisecond order in apparatuses (the switches 100, the end points 200, or the like) for FA applications is small, and therefore, it is considered that the path indicator (the number of hops) have a greater influence on accuracy of the clock time synchronization than accuracy of time (clock accuracy) that the "timer" has.

With such a background, a range in which accuracy of the clock time synchronization is secured, for example, a range in which the propagated error has a predetermined size is decided on the basis of the path indicator (the number of hops of the topology) first, and each timer that the apparatus in the decided range has is defined as a candidate of a grand master in the present embodiment. Then, the accuracy indicator calculation unit 741 calculates new accuracy of the timer from the time accuracy (clock information 605) and the path indicator of each candidate timer, and the timer decision unit 711 decides a candidate timer with high new accuracy as a grand master.

In the case of (A) of FIG. 35, for example, it is determined that there are apparatuses "A" and "B" as candidates of a grand master within a range in which an error propagated to the target apparatus has a predetermined size (that is, a range decided by the number of hops of topology). Even if the apparatus "A" as a candidate of a grand master has higher time accuracy than the apparatus "B", the number of hops is taken into consideration for the aforementioned new accuracy, the apparatus "B" has higher new accuracy, for example, and it is thus possible to decide the timer of the apparatus "B" as a grand master.

Q. Appendix

The present embodiments as described above have the following technical ideas.

[Configuration 1]

A control system including a plurality of apparatuses (100, 200) connected to an FA network (2),
in which each of the plurality of apparatuses includes a timer (101, 201) that manages a time,
the timers of the plurality of apparatuses performs clock time synchronization with a reference timer that manages a reference time,
the plurality of apparatuses include
one or more end apparatuses (200) connected to ends of the network, and
a plurality of transfer apparatuses (100) transferring data related to control to the one or more end apparatuses,
the control system comprising:
a timer decision means (711) for deciding the reference timer out of timers that the plurality of transfer apparatuses have,
in which the timer decision means
includes a path indicator acquisition means (721) for acquiring, for each of the plurality of transfer apparatuses, a path indicator which indicates a length of a path on a network through which the data passes from the transfer apparatus until arrival at the one or more end apparatuses, and
decides the reference timer out of the timers of the one or more transfer apparatuses having the path indicator which indicates that a path until the arrival at the one or more end apparatuses has a predetermined length.

[Configuration 2]

The control system according to Configuration 1, in which time information of the reference timer is transferred to a target apparatus in the clock time synchronization, and the predetermined length of the path includes a length that is able to secure a constant communication delay for transfer of the time information to the target apparatus.

[Configuration 3]

The control system according to Configuration 1 or 2, in which the plurality of transfer apparatuses include one or more controllers that execute control arithmetic operations at cycles based on the clock time synchronization and transfer data related to the control, which is a result of the arithmetic operations, to the network, and the one or more end apparatuses include an apparatus (620) controlling a control target using the data related to the control transferred from a controller with a shortest cycle out of the one or more controllers.

[Configuration 4]

The control system according to Configuration 3, in which the control target includes a motion control target, a behavior of which is controlled in accordance with the data related to the control.

[Configuration 5]

The control system according to any one of Configurations 1 to 4, in which the timer decision means further includes an accuracy indicator calculation means (741) for calculating an accuracy indicator indicating accuracy of the clock time synchronization from accuracy of the times of the timers and the path indicators of the transfer apparatuses that include the timers, and a candidate selection means (731, 731a) for selecting one or more candidates for deciding the reference timer out of the timers of the one or more transfer apparatuses that have the path indicators indicating that the paths until the arrival at the one or more end apparatuses have the predetermined length, and the reference timer is decided on the basis of the accuracy indicator of each selected timer out of the one or more timers selected as the candidates.

[Configuration 6]

The control system according to Configuration 5, in which the candidate selection means further specifies a controller with a shortest cycle out of one or more controllers included in the one or more transfer apparatuses with the path indicators indicating the paths with the predetermined length, and selects, as the one or more candidates for deciding the reference timer, timers included by the specified controller and one or more transfer apparatuses through which the data from the controller passes until arrival at the one or more end apparatuses.

[Configuration 7]

The control system according to any one of Configurations 1 to 5, in which the timer decision means further includes an accuracy indicator calculation means (741) for calculating an indicator indicating accuracy of the clock time synchronization from accuracy of the times of the timers and the path indicators of the transfer apparatuses that have the timers, and decides the reference timer on the basis of the accuracy indicator of each timer out of the timers that the plurality of transfer apparatuses have.

[Configuration 8]

The control system according to any one of Configurations 1 to 7, further including: a means (702) for selecting one transfer apparatus out of the plurality of transfer apparatuses on the basis of information indicating margins of resources of each transfer device relating to program execution, in which the one selected transfer device includes the timer decision means.

[Configuration 9]

An information processing device (500) that is able to be connected to a control system including a plurality of apparatuses (100, 200) connected to an FA network (2), in which each of the plurality of apparatuses includes a timer (101, 201) that manages a time, the timers of the plurality of apparatuses perform clock time synchronization with a reference timer that manages a reference time, the plurality of apparatuses includes one or more end apparatuses (200) connected to ends of the network, and a plurality of transfer apparatuses (100) that transfer data related to control to the one or more end apparatuses, the information processing device including: a timer decision means (711) for deciding the reference timer out of the timers that the plurality of transfer apparatuses have, in which the timer decision means includes a path indicator acquisition means (721) for acquiring, for each of the plurality of transfer apparatuses, a path indicator which indicates a length of a path on a network through which data passes from the transfer apparatus until arrival at the one or more end apparatuses, and a candidate selection means for selecting one or more candidates for deciding the reference timer out of the timers of the one or more transfer apparatuses having the path indicator which indicates that a path until the arrival at the one or more end apparatuses has a predetermined length.

[Configuration 10]

A program (77, 771) that causes a computer (102, 502) to execute a setting method for a control system including a plurality of apparatuses (100, 200), connected to an FA network (2), in which each of the plurality of apparatuses has a timer (101, 201) that manages a time, the timers of the plurality of apparatuses perform clock time synchronization with a reference timer that manages a reference time, the plurality of apparatuses include one or more end apparatuses (200) connected to ends of the network, and a plurality of transfer apparatuses (100) that transfer data related to control to the one or more end apparatuses, the setting method includes the step of deciding (T10, T11, T11a, T13) the reference timer out of the timers that the plurality of transfer apparatuses have, and the step of deciding the reference timer includes the steps of acquiring (T10), for each of the plurality of transfer apparatuses, a path indicator which indicates a length of a path on a network through which the data passes from the transfer apparatus until arrival at the one or more end apparatuses, and deciding (T11) the reference timer out of the timers of the one or more transfer apparatuses having the path indicator which indicates that a path until the arrival at the one or more end apparatuses has a predetermined length.

The embodiments disclosed hitherto are just examples in terms of all points and should be considered not be restrictive. The scope of the disclosure is represented by the claims rather than the above description, and all modifications within the meanings and the range equivalent to those of the claims are intended to be included.

The invention claimed is:

1. A control system including a plurality of apparatuses connected to a factory automation (FA) network,
wherein each of the plurality of apparatuses includes a timer that manages a time,
the timers of the plurality of apparatuses perform clock time synchronization with a reference timer that manages a reference time,
the plurality of apparatuses include:
one or more end apparatuses connected to ends of the network, and
a plurality of transfer apparatuses transferring data related to control to the one or more end apparatuses,
the control system comprising:
a timer decision means for deciding the reference timer out of timers that the plurality of transfer apparatuses have,
wherein the timer decision means
includes a path indicator acquisition means for acquiring, for each of the plurality of transfer apparatuses, a path indicator which indicates a length of a path on a network through which the data passes from the transfer apparatus until arrival at the one or more end apparatuses, and
decides the reference timer out of the timers of the one or more transfer apparatuses having the path indicator which indicates that a path until the arrival at the one or more end apparatuses has a predetermined length.

2. The control system according to claim 1,
wherein time information of the reference timer is transferred to a target apparatus in the clock time synchronization, and
the predetermined length of the path includes a length that is able to secure a constant communication delay for transfer of the time information to the target apparatus.

3. The control system according to claim 1,
wherein the plurality of transfer apparatuses include
one or more controllers that execute control arithmetic operations at cycles based on the clock time synchronization and transfer data related to the control, which is a result of the arithmetic operations, to the network, and
the one or more end apparatuses include an apparatus controlling a control target using the data related to the control transferred from a controller with a shortest cycle out of the one or more controllers.

4. The control system according to claim 3, wherein the control target includes a motion control target, a behavior of which is controlled in accordance with the data related to the control.

5. The control system according to claim 1,
wherein the timer decision means further includes
an accuracy indicator calculation means for calculating an accuracy indicator indicating accuracy of the clock time synchronization from accuracy of the times of the timers and the path indicators of the transfer apparatuses that include the timers, and
a candidate selection means for selecting one or more candidates for deciding the reference timer out of the timers of the one or more transfer apparatuses that have the path indicators indicating that the paths until the arrival at the one or more end apparatuses have the predetermined length, and the reference timer is decided on the basis of the accuracy indicator of each selected timer out of the one or more timers selected as the candidates.

6. The control system according to claim 5, wherein the candidate selection means further
specifies a controller with a shortest cycle out of one or more controllers included in the one or more transfer apparatuses with the path indicators indicating the paths with the predetermined length, and
selects, as the one or more candidates for deciding the reference timer, timers included by the specified controller and one or more transfer apparatuses through which the data from the controller passes until arrival at the one or more end apparatuses.

7. The control system according to claim 1, wherein the timer decision means further
includes an accuracy indicator calculation means for calculating an indicator indicating accuracy of the clock time synchronization from accuracy of the times of the timers and the path indicators of the transfer apparatuses that have the timers, and
decides the reference timer on the basis of the accuracy indicator of each timer out of the timers that the plurality of transfer apparatuses have.

8. The control system according to claim 1, further comprising:
a means for selecting one transfer apparatus out of the plurality of transfer apparatuses on the basis of information indicating margins of resources of each transfer device relating to program execution,
wherein the one selected transfer device includes the timer decision means.

9. An information processing device that is able to be connected to a control system including a plurality of apparatuses connected to a factory automation (FA) network,
wherein each of the plurality of apparatuses includes a timer that manages a time,
the timers of the plurality of apparatuses perform clock time synchronization with a reference timer that manages a reference time,
the plurality of apparatuses includes
one or more end apparatuses connected to ends of the network, and
a plurality of transfer apparatuses that transfer data related to control to the one or more end apparatuses,
the information processing device comprising:
a timer decision means for deciding the reference timer out of the timers that the plurality of transfer apparatuses have,
wherein the timer decision means includes a path indicator acquisition means for acquiring, for each of the plurality of transfer apparatuses, a path indicator which indicates a length of a path on a network through which data passes from the transfer apparatus until arrival at the one or more end apparatuses, and a candidate selection means for selecting one or more candidates for deciding the reference timer out of the timers of the one or more transfer apparatuses having the path indicator which indicates that a path until the arrival at the one or more end apparatuses has a predetermined length.

10. A non-transitory computer readable medium, storing a program that causes a computer to execute a setting method for a control system including a plurality of apparatuses connected to a factory automation (FA) network,
in which each of the plurality of apparatuses has a timer that manages a time,
the timers of the plurality of apparatuses perform clock time synchronization with a reference timer that manages a reference time,
the plurality of apparatuses include
one or more end apparatuses connected to ends of the network, and
a plurality of transfer apparatuses that transfer data related to control to the one or more end apparatuses,
the setting method includes the step of
deciding the reference timer out of the timers that the plurality of transfer apparatuses have, and
the step of deciding the reference timer includes the steps of
acquiring, for each of the plurality of transfer apparatuses, a path indicator which indicates a length of a path on a network through which the data passes from the transfer apparatus until arrival at the one or more end apparatuses, and
deciding the reference timer out of the timers of the one or more transfer apparatuses having the path indicator which indicates that a path until the arrival at the one or more end apparatuses has a predetermined length.

* * * * *